United States Patent
Park et al.

(10) Patent No.: US 8,334,947 B2
(45) Date of Patent: Dec. 18, 2012

(54) BACKLIGHT ASSEMBLY AND DISPLAY DEVICE HAVING THE SAME

(75) Inventors: Yong-Eun Park, Suwon-si (KR); Jin-Soo Shin, Asan-si (KR); Ki-Yong Park, Seoul (KR); Jin-Yong Park, Gunpo-si (KR); Jin-Ho Park, Suwon-si (KR)

(73) Assignee: Samsung Display Co., Ltd. (KR)

( * ) Notice: Subject to any disclaimer, the term of this patent is extended or adjusted under 35 U.S.C. 154(b) by 262 days.

(21) Appl. No.: 12/776,709

(22) Filed: May 10, 2010

(65) Prior Publication Data
US 2011/0019127 A1    Jan. 27, 2011

(30) Foreign Application Priority Data
Jul. 21, 2009    (KR) .................. 10-2009-0066419

(51) Int. Cl.
*G02F 1/1335*    (2006.01)
*F21V 7/04*    (2006.01)
(52) U.S. Cl. ........................ 349/65; 362/634
(58) Field of Classification Search ............... 349/61–70
See application file for complete search history.

(56) References Cited

U.S. PATENT DOCUMENTS

| | | | |
|---|---|---|---|
| 2005/0057946 A1* | 3/2005 | Kim ............................. | 362/561 |
| 2008/0007947 A1* | 1/2008 | Yokota et al. ................ | 362/225 |
| 2008/0079865 A1* | 4/2008 | Kang et al. .................... | 349/61 |
| 2009/0153771 A1* | 6/2009 | Huo et al. ..................... | 349/60 |

FOREIGN PATENT DOCUMENTS

| | | |
|---|---|---|
| JP | 2008-034357 A | 2/2008 |
| JP | 2008-076441 A | 4/2008 |
| KR | 1020010019450 A | 3/2001 |

* cited by examiner

*Primary Examiner* — Mark Robinson
*Assistant Examiner* — Charles Chang
(74) *Attorney, Agent, or Firm* — Innovation Counsel LLP

(57) ABSTRACT

Provided are a backlight assembly and a display device having the same. The backlight assembly comprises an elongated first high voltage lamp extending in a first direction and having respective first and second ends. A second similar lamp is provided so as to be separated at its ends from the corresponding first and second ends of the first lamp by a first gap distance (d1) and to extend substantially, but not fully parallel to the first lamp. An intermediated gap fixing part is provided for fixing at an intermediate position along the lengths of the first and second lamps a second separation gap distance (d2) that is smaller than the first gap distance. As a result of the positioning of the smaller second gap, if it happens at all; electrical interaction noise and/or corona discharge between the high voltage lamps is encouraged to occur at the position of this smaller second gap distance (d2) rather than at the terminal ends of the lamps whereat the lamps couple via power conductors to other parts of the display system.

17 Claims, 20 Drawing Sheets

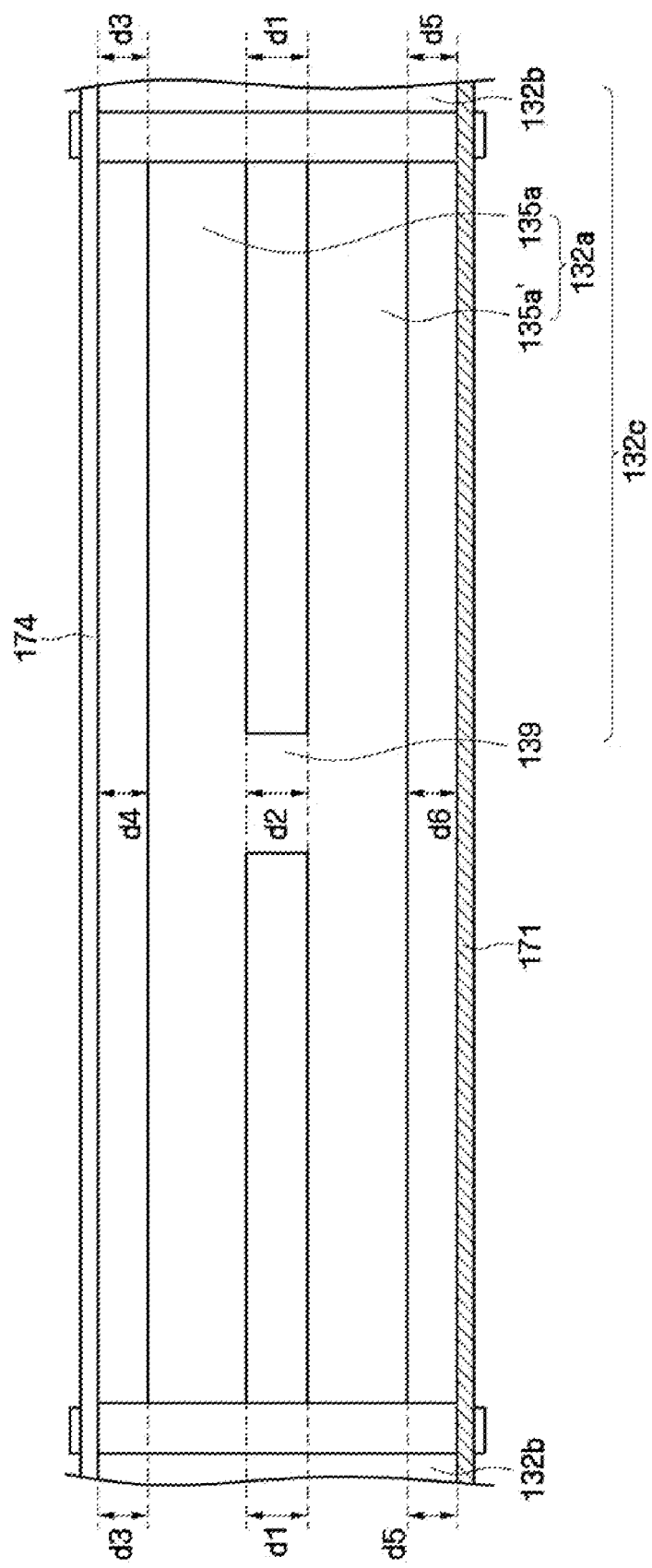

BACKLIGHT ASSEMBLY AND DISPLAY DEVICE HAVING THE SAME

This application claims priority from Korean Patent Application No. 10-2009-0066419 filed on Jul. 21, 2009 in the Korean Intellectual Property Office, the disclosure of which application is incorporated herein by reference in its entirety.

BACKGROUND

1. Field of Disclosure

The present disclosure of invention relates to a backlight assembly and to a display device having the same.

2. Description of Related Technology

Liquid crystal displays (LCDs) are widely used types of flat panel displays. Generally, an LCD comprises two spaced apart panels having electrodes on each and a liquid crystal material layer interposed between the panels. In a typical LCD, voltages are applied to the electrodes of the upper and lower panels to thereby generate an electric field that passes through the liquid crystal material layer. The electric field determines the alignment of liquid crystal molecules in the liquid crystal layer, thereby controlling optical polarization and ultimately the amount of light that passes through the liquid crystal layer. As a result, a desired image can be displayed on the LCD.

Because the LCD itself is a passive light-shuttering device, the LCD is generally stacked on top of a backlight assembly which is powered to supply light to the overlying upper and lower panels (also known as the upper and lower substrates).

As LCDs become slimmer, it is desirable for backlight assemblies to also become slimmer. According to one approach, the gap between a plurality of elongated and essentially parallel lamps that are included in the backlight assembly is reduced. The reduced gap may cause the lamps to interact undesirably with each other, thereby increasing electrical noise in the system and possibly generating a corona discharge that undesirably couples to system electronics. As a result, the reliability and operational lifetime of the overall display device can be undermined.

Additionally, there is another gap as between the lamps and surrounding metal reflectors of the system housing. If this other gap is allowed to become too small; rather than interacting with one another, the lamps may interact with the housing, thereby also increasing noise or risking a corona discharge that undesirably couples to the system housing.

SUMMARY

An embodiment in accordance with the present disclosure of invention provides a backlight assembly with reduced noise and enhanced reliability relative to backlighting assemblies that do not take the precautions disclosed herein.

An embodiment in accordance with the present disclosure of invention also provides a display device with reduced noise and enhanced reliability.

According to an exemplary embodiment, there is provided a backlight assembly comprising: an elongated first lamp extending in a first direction and having first and second ends; an elongated second lamp separated at its ends from the first and second ends of the first lamp by a first predetermined gap distance (d1) and extending substantially but not fully in parallel to the first lamp; and an intermediate distance-fixing part structured to fix the first and second lamps in position but to bend them slightly towards each other at an intermediate (e.g., middle) portion of their elongations such that a smaller, second gap distance (d2) is created between adjacent intermediate (e.g., middle) portions of the first and second lamps, whereby if it happens at all; electrical interaction noise and/or corona discharge between the lamps is encouraged to occur at the position of this smaller second gap distance (d2) rather than at the terminal ends of the lamps whereat the lamps couple via conductors to other parts of the display system.

According to another aspect of the present disclosure, there is provided a backlight assembly comprising: an elongated first lamp extending in a first direction and having first and second ends; an electrically conductive housing (e.g., having metal reflectors) which comprises a first surface (e.g., first metalized reflector surface) which is separated from the first and second ends of the first lamp by a third gap and extends substantially but not fully parallel to the first lamp; and a distance-fixing part provided at an intermediate position along the length of the elongated first lamp so as to fix the first lamp in position and bend it slightly away from the first surface at that intermediate (e.g., middle) position such that a larger fourth gap is provided as between the first lamp and the adjacent portion of the first surface of the housing at that intermediate location, whereby if it happens at all; electrical interaction noise and/or corona discharge between the first lamp and the adjacent first housing surface (e.g., first metalized reflector surface) is discouraged from occurring at the position of this larger fourth gap (d4) and instead encouraged to happen elsewhere (e.g., across the smaller second gap distance, d2) so that electrical interaction noise and/or corona discharge is not likely to couple to the system housing at the location of the larger fourth gap (d4).

According to yet another aspect of the present disclosure, there is provided a display device comprising: a flat panel display assembly for displaying an image; and a backlight assembly providing light to the display assembly and coupled to a housing of the display assembly, wherein the backlight assembly comprises: an elongated first lamp extending in a first direction; a second lamp separated from the first lamp and extending substantially but not fully parallel to the first lamp; and one or more distance-fixing parts provided for fixing gap distances as between the first and second lamps and as between the lamps and surfaces of the housing such that, if it happens at all; electrical interaction noise and/or corona discharge will occur between the lamps at an intermediate (e.g., middle) portion of their elongations and not near terminal ends of the lamps and not as between the lamps and surrounding housing surfaces.

BRIEF DESCRIPTION OF THE DRAWINGS

The above and other aspects and features of the present disclosure of invention will become more apparent by describing in detail exemplary embodiments thereof with reference to the attached drawings, in which:

FIG. 21 is a side view of the backlight assembly shown in FIG. 20.

DETAILED DESCRIPTION

Figure 1:
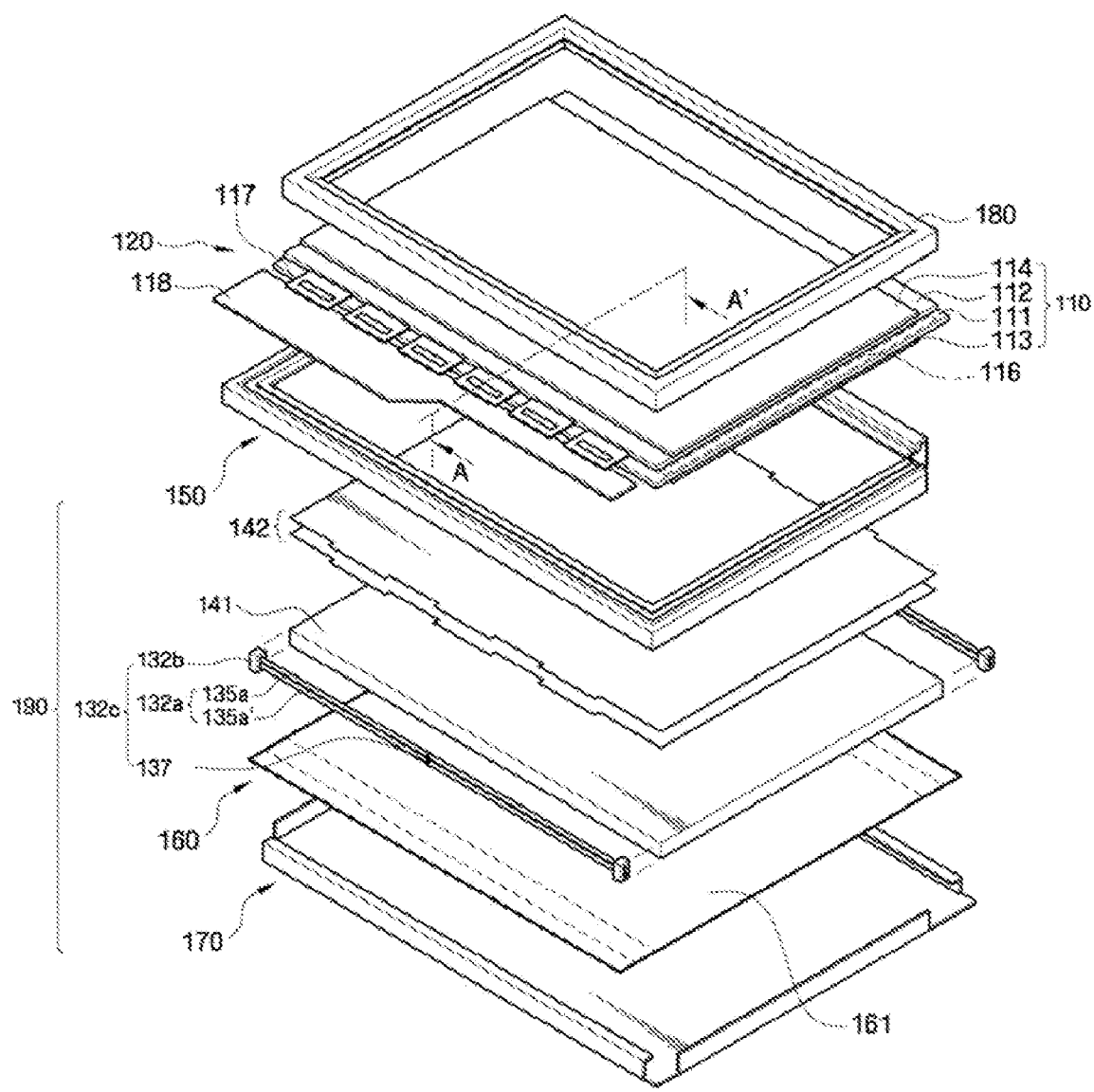
FIG. 1 is an exploded perspective view of a display device according to a first exemplary embodiment.

Advantages and features in accordance with the disclosure and methods of accomplishing the same may be understood more readily by reference to the following detailed description of exemplary embodiments and the accompanying drawings. The present teachings may, however, be embodied in many different forms and should not be construed as being limited to the exemplary embodiments set forth herein. Rather, these embodiments are provided so that this disclosure will be thorough and complete and will fully convey the concept of the teachings to those skilled in the relevant arts to which the teachings pertain. In the drawings, sizes and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

Like reference numerals refer to like elements throughout the specification. As used herein, the term "and/or" includes any and all combinations of one or more of the associated listed items. It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the present invention.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this disclosure of invention most closely pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a backlight assembly and a display device according to a first exemplary embodiment of the present invention will be described with reference to FIGS. 1 through 12.

First, the display device according to the first exemplary embodiment of the present disclosure will be described with reference to FIGS. 1 and 2.

FIG. 1 is an exploded perspective view of a display device according to a first exemplary embodiment of the present disclosure. FIG. 2 is a cross-sectional view of the display device taken along the line A-A' of FIG. 1.

As used herein, the term "horizontal direction" denotes a direction parallel to a long side edge of the display device, and the term "vertical direction" denotes a direction parallel to a short side edge of the display device. In FIG. 2, the short side edge is illustrated as extending vertically in the drawing while the long side edge is illustrated as extending in perspective towards the back.

Figure 2:
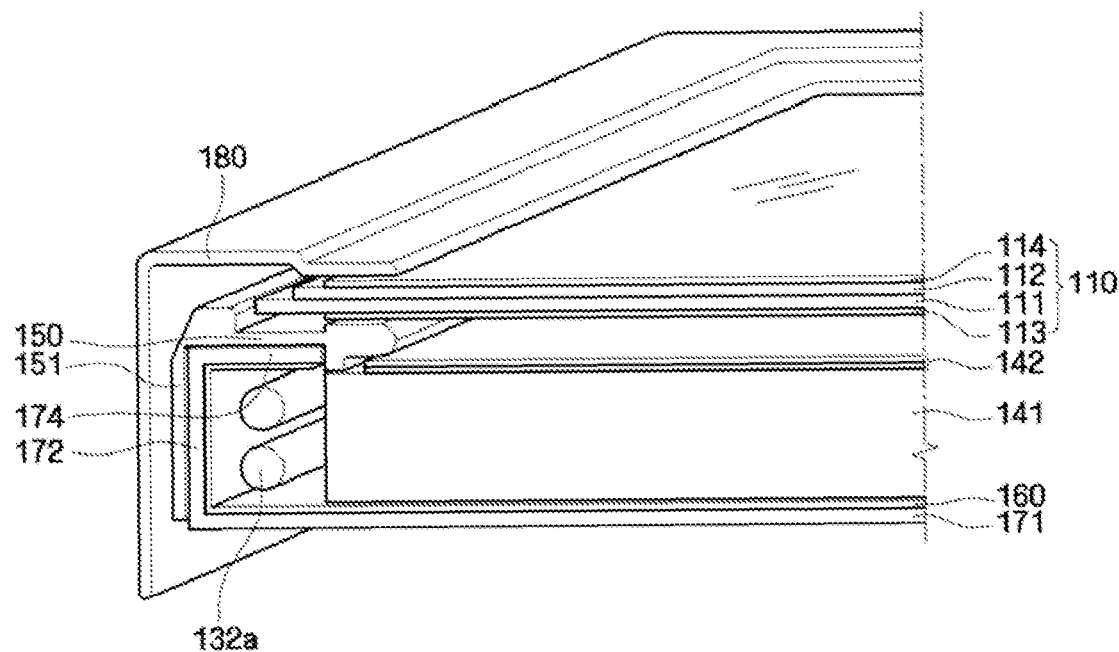
FIG. 2 is a cross-sectional view of the display device taken along the line A-A' of FIG. 1.

Referring to FIGS. 1 and 2, the display device broadly comprises a display panels assembly 120 and a backlight assembly 190.

The display panels assembly 120 comprises a plurality of display panels 110, a liquid crystals material layer (not shown) interposed between two of the panels, a gate lines driver circuit area 116, a flexible film 117, and a printed circuit board (PCB) 118 electrically coupled to the main panels by the flexible film 117. The display panels 110 include a first substrate 111 (lower substrate), a second substrate 112 (upper substrate), and polarizers 113 (lower) and 114 (upper) respectively disposed below/on and sandwiching the surfaces of the first and second substrates 111 and 112. It is to be understood that the display panels assembly 120 may be sensitive to externally generated noise and that it is undesirable to allow externally generated noise of substantial magnitude to couple into sensitive electronic structures or components of the display panels assembly 120.

In terms of more specifics, the display panels 110 comprise the first substrate 111, the second substrate 112 spaced apart from but facing the first substrate 111, the lower polarizer 113 being disposed under the first substrate 111, and the upper polarizer 114 disposed on top of the second substrate 112. The first substrate 111 comprises gate lines (not shown), data lines (not shown) and pixel electrodes. The second substrate 112 comprises a black matrix, color filters, and a common electrode. In an alternate embodiment, the color filters and the common electrode may also be formed on the first substrate 111, depending on the type of the display panel 110.

The display panels combination 110 having the above flat plate-shaped substrates stacked therein is placed on an intermediate housing 150 which will be described later.

The gate lines driver circuit 116 is integrated on the first substrate 111 and connected to each of plural gate lines (not shown). The flexible film 117 is connected to each of plural data lines (not shown) integrally formed on the first substrate 111.

Various electrical signal driving parts (e.g., integrated circuits) may be mounted on the PCB 118. The driving parts may process a gate-driving signal and a data-driving signal and transmit the processed gate-driving signal to the gate driver 116 and the processed data-driving signal to the flexible film 117.

The backlight assembly 190 comprises a multi-lamps unit 132c (one or more such units 132c, where a second is shown in the back in FIG. 1), a light guide plate (LGP) 141, one or more optical sheets 142, a reflective sheet 160, a lower housing 170, and the aforementioned intermediate housing 150.

Each multi-lamps unit 132c comprises a group of linear and somewhat bendable lamps 132a, first and second end holders 132b for the lamps, and a midpoint distance-fixing part 137. The individual lamps in the lamps group 132a may comprise first and second lamps 135a and 135a' which extend in one direction to be substantially parallel to each other. The lamps group part 132a may also comprise more than two high voltage lamps that extend substantially (but not fully, as will be seen) parallel to each other and are spaced closely to each other and or to metalized housing parts such that electrical interaction between or corona discharge from one of the lamps may take place.

The ends holders 132b simultaneously fix end portions of the first and second lamps 135a and 135a' of the lamps group part 132a. The specific positional relationship and shapes and dimensions of the end holders 132b will be described in detail later.

The intermediate distance-fixing part 137 fixes the first and second lamps 135a and 135a' of the lamp part 132a thereto. The specific positional relationship and shape of the distance-fixing part 137 will also be described in detail later.

The lamps group unit 132c may be of an edge illuminating type. Thus, the one or more elongated lamp units 132c may be disposed on one or more sides of the display device in the vertical direction of the display device. The first and second lamps 135a and 135a' comprised in each of the multi-lamp group units 132c may be, for example, cold cathode fluorescent lamps (CCFLs) or external electrode fluorescent lamps (EEFLs) that are often operated at relatively high voltages.

The lamp units 132c may be line-type light sources and disposed substantially parallel to the horizontal direction of the display device.

Specifically, the lamp part 132a may be disposed on both sides of the LGP 141 as shown for example in FIG. 1 to provide light to the LGP 141. Although not shown in the drawings, the lamp units 132c may be electrically connected to an inverter (not shown), which supplies high voltage power, and thus the lamps receive power from the inverter. The inverter (not shown) is driven by other electronics of the display system. The lamp units 132c and the LGP 141 are housed in the lower housing 170.

In order to efficiently guide light sourced from the edge-lighting lamps, the LGP 141 may be made of a light-transmitting material, for example, a material having a predetermined index of refraction greater than that of air, such as acrylic resin (e.g., polymethyl methacrylate (PMMA)) or polycarbonate (PC).

Light rays incident upon a side surface of the LGP 141, which is made of the above material, generally have an angle less than a critical refraction angle of the LGP 141. Thus, the light is input to the LGP 141. When the light is incident upon an internal upper or lower surface of the LGP 141, the angle of the light rays is greater than the critical refraction angle of the internal surface inside the LGP 141. Thus, the light is selectively internally reflected within the LGP 141. The light is caused to be substantially evenly distributed within the LGP 141 and guided for output from a top output surface of the LGP.

A redirection pattern (not shown) may be formed on any one of the upper and lower surfaces of the LGP 141, for example, on the lower surface of the LGP 141, such that guided light is caused to mostly come out of the LGP 141 in an upward direction from its top output surface.

The optical sheets 142 are disposed on the upper surface of the LGP 141 and diffuse and concentrate light that is received from the LGP 141. The optical sheets 142 may comprise a diffusion sheet, a prism sheet, and a protective sheet.

The optical sheets 142 and the LGP 141 are pressed together by the intermediate housing 150 and thus fixed in position relative to one another.

The intermediate housing 150 may be a rectangular frame having sidewalls 151 which are coupled respectively to sidewalls 172 of the lower housing 170. The sidewalls 151 of the intermediate housing 150 may be coupled respectively to the sidewalls 172 of the lower housing 170 such as shown in perspective in FIG. 2.

The intermediate housing 150 may be a molded unitary frame made of, e.g., a plastic or other appropriate material that is structured to prevent parts fixed in position by the intermediate housing 150 from being damaged.

To be reflective, the reflective sheet 160 may be made of, e.g., polyethylene terephthalate (PET). In addition, a diffusion layer containing, e.g., titanium dioxide, may be coated on a surface of the reflective sheet 160.

The reflective sheet 160 covers the lower surface of the LGP 141 and the lamp units 132c and thus reflects light, which is emitted from the lower surface of the LGP 141 and light, which is emitted toward side surfaces of the lower housing 170, in an upward direction. Specifically, the reflective sheet 160 reflects light, which has not been reflected by a micro-dot pattern (not shown) formed on a rear surface of the LGP 141, toward a desired exit surface (i.e., the upper surface) of the LGP 141, thereby reducing light loss.

The reflective sheet 160 is attached to the lower housing 170 using, e.g., a double-sided tape to cover a bottom plate 171, the sidewalls 172, and top plates 174 of the lower housing 170.

The reflective sheet 160 may also be laminated to the bottom plate 171, the sidewalls 172, and the top plates 174 of the lower housing 170.

An upper housing 180 may be disposed on the display panel 110 to cover an upper surface of the display panel 110 housed in the lower housing 170 and may be coupled to the lower housing 170. A window is formed in an upper surface of the upper housing 180 to expose the display panel 110.

The upper housing 180 may be coupled to the lower housing 170 by hooks (not shown) and/or screws (not shown) or other appropriate fasteners. The upper housing 180 and the lower housing 170 may also be coupled to each other in various ways.

The lower housing 170 may be made of an electrically conductive metal material to thereby secure strength for the device and to withstand external impact and to provide an electrical grounding and/or shielding capability.

The lower housing 170 comprises the bottom plate 171 on which the LGP 141 and the lamp units 132c are mounted, the sidewalls 172 which extend from edges of the bottom plate 171 in a direction substantially perpendicular to the bottom plate 171 and surround the bottom plate 171, and the top plates 174 which extend from upper ends of the sidewalls 172 to cover the lamp units 132c but do not overlap the LGP 141.

The bottom plate 171, the sidewalls 172, and the top plates 174 of the lower housing 170 may be formed integrally with one another.

Each edge region of the lower housing 170, which consists of a corresponding integral edge extension of the bottom plate 171, may define a corresponding one of the sidewalls 172, and a corresponding one of the top plates 174, where the bottom plate edge extensions have been bent in a "U" shape to thereby reflectively enclose a corresponding one of the supplied multi-lamp units 132c. A separate reflective cover (not shown) may also be installed to reflectively encase each of the lamp units 132c.

The distance-fixing part 137 of the backlight assembly 190 according to the first exemplary embodiment of the present disclosure will now be described with reference to FIGS. 3 through 5.

Figure 3:
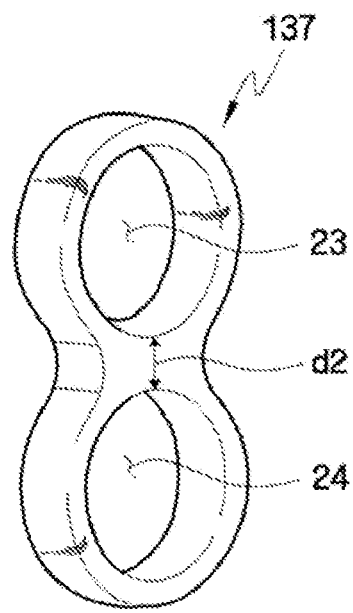
FIG. 3 is a perspective view of a distance-fixing part of the backlight assembly according to the first exemplary embodiment.

FIG. 3 is a perspective view of the distance-fixing part 137 of the backlight assembly 190 according to the first exemplary embodiment of the present disclosure. FIG. 4 is a side view of the distance-fixing part 137 shown in FIG. 3. FIG. 5 is a partial perspective view of the distance-fixing part 137 of FIG. 3 to which the first and second lamps 135a and 135a' are coupled so as to be spaced apart at that location by a distance d2.

Figure 4:
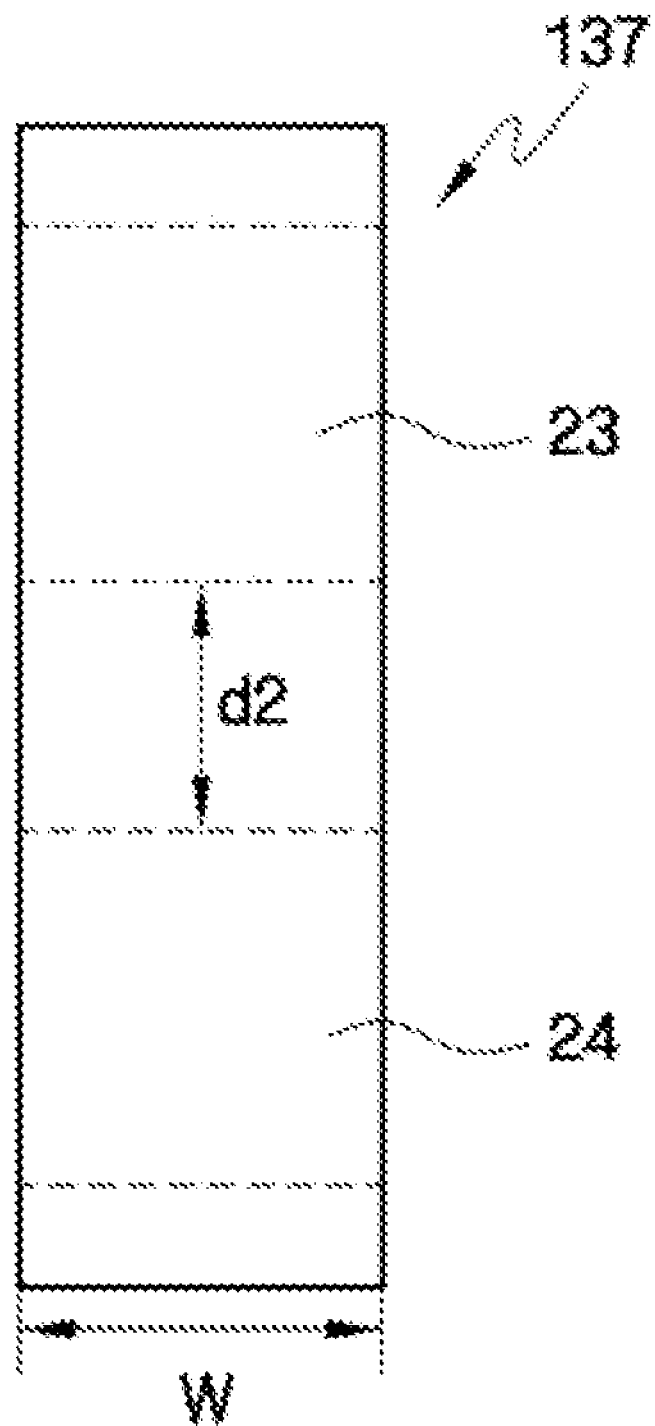
FIG. 4 is a side view of the distance-fixing part shown in FIG. 3.
Figure 5:
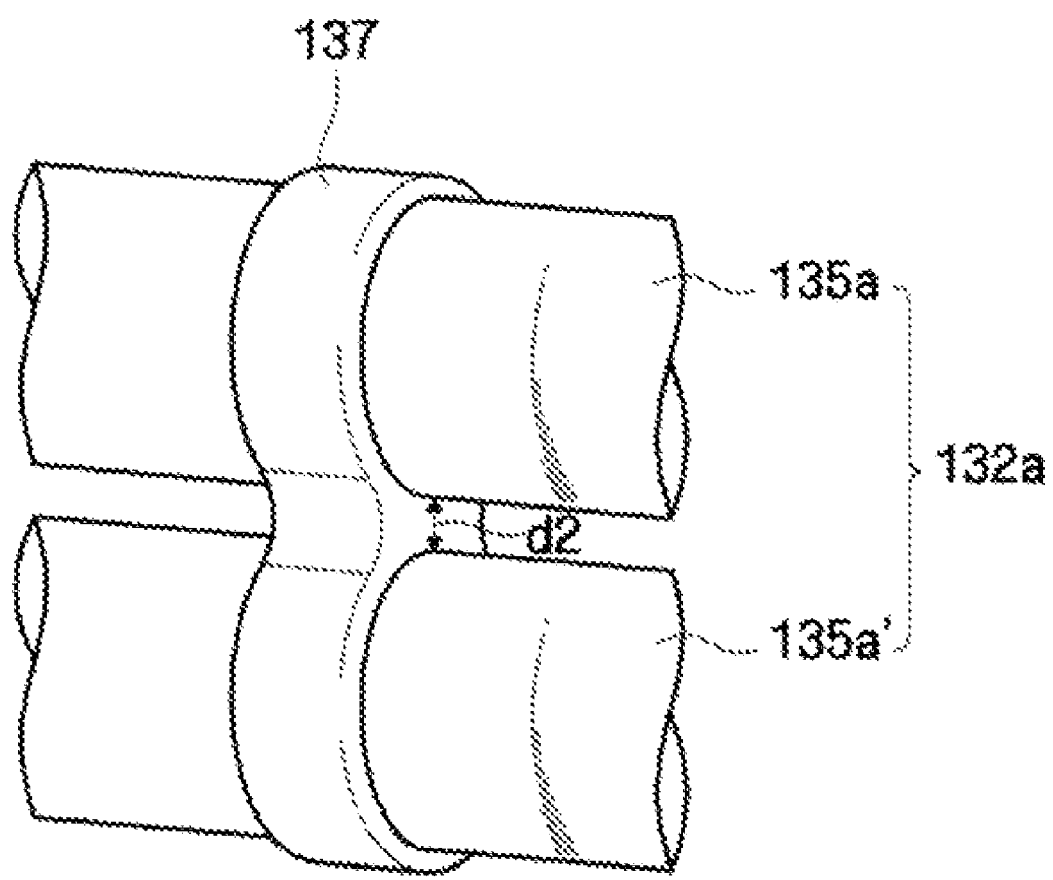
FIG. 5 is a partial perspective view of the distance-fixing part of FIG. 3 to which first and second lamps are coupled.

Referring to FIGS. 3 through 5, the distance-fixing part 137 has a first through-hole 23 and a second through-hole 24 defined in it.

The first and second through-holes 23 and 24 respectively fix the first and second lamps 135a and 135a' of each of the multi-lamp units 132a (see FIG. 1) to the distance-fixing part 137.

Specifically, the first lamp 135a is passed through the first through-hole 23 in the horizontal direction and thus is fixed to the distance-fixing part 137. In addition, the second lamp 135a' is passed through the second through-hole 24 in the horizontal direction and thus is fixed to the distance-fixing part 137. Here, the first and second lamps 135a and 135a' contact the distance-fixing part 137 in the first and second through-holes 23 and 24, respectively. Accordingly, the first and second lamp 135a and 135a' are fixed to the distance-fixing part 137.

The first and second through-holes 23 and 24 may be shaped and dimensioned substantially like the outside of the first and second lamps 135a and 135a' to effectively fix the first and second lamps 135a and 135a' to the distance-fixing part 137.

The number of the first and second through-holes 23 and 24 may be equal to the number of lamps comprised in the multi-lamp part 132a (see FIG. 1).

A so-called second gap distance, d2 between the first and second through-holes 23 and 24 may be substantially equal to a desired gap distance between the first and second lamps 135a and 135a' at the position where they are fixed by the distance-fixing part 137. This is because the first and second lamps 135a and 135a' contact the distance-fixing part 137 in the first and second through-holes 23 and 24 as described above.

That is, the second gap distance d2 may be a gap between the first and second through-holes 23 and 24 formed in the distance-fixing part 137 and, at the same time, a gap between the first and second lamps 135a and 135a' fixed by the distance-fixing part 137.

The distance-fixing part 137 may have a width W (see FIG. 4) that allows it, after it has been slipped on, to simultaneously fix the first and second lamps 135a and 135a' thereto without thereafter sliding along the first and second lamps 135a and 135a'. The width W of the distance-fixing part 137 may be, but is not limited to, for example, 1 mm. The distance-fixing part 137 may be made of a light-passing silicone material. The material of the distance-fixing part 137 may be such that it can temporarily retain a liquid lubricant between itself and the lamp outer surfaces as it is being slipped on. When the liquid lubricant is then removed (e.g., with an appropriate solvent), the distance-fixing part 137 is no longer able to easily slide. In an alternate embodiment, thermal expansion is used to temporarily make the distance-fixing part 137 larger than it is at normal operating temperatures.

The holders 132b of the backlight assembly 190 according to the first exemplary embodiment of the present disclosure will now be described with reference to FIGS. 6 through 9.

Figure 6:
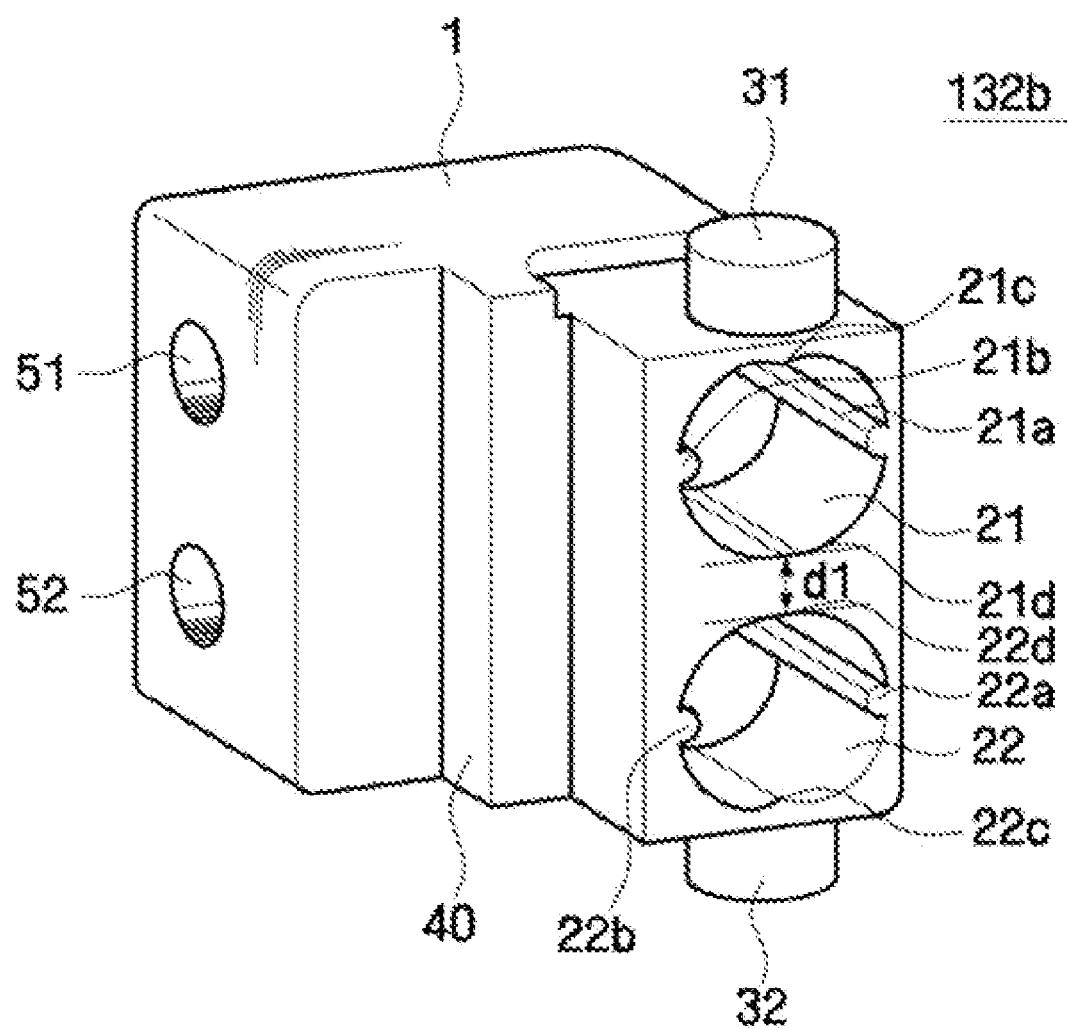
FIG. 6 is a perspective view of a holder of the backlight assembly according to the first exemplary embodiment.
Figure 7:
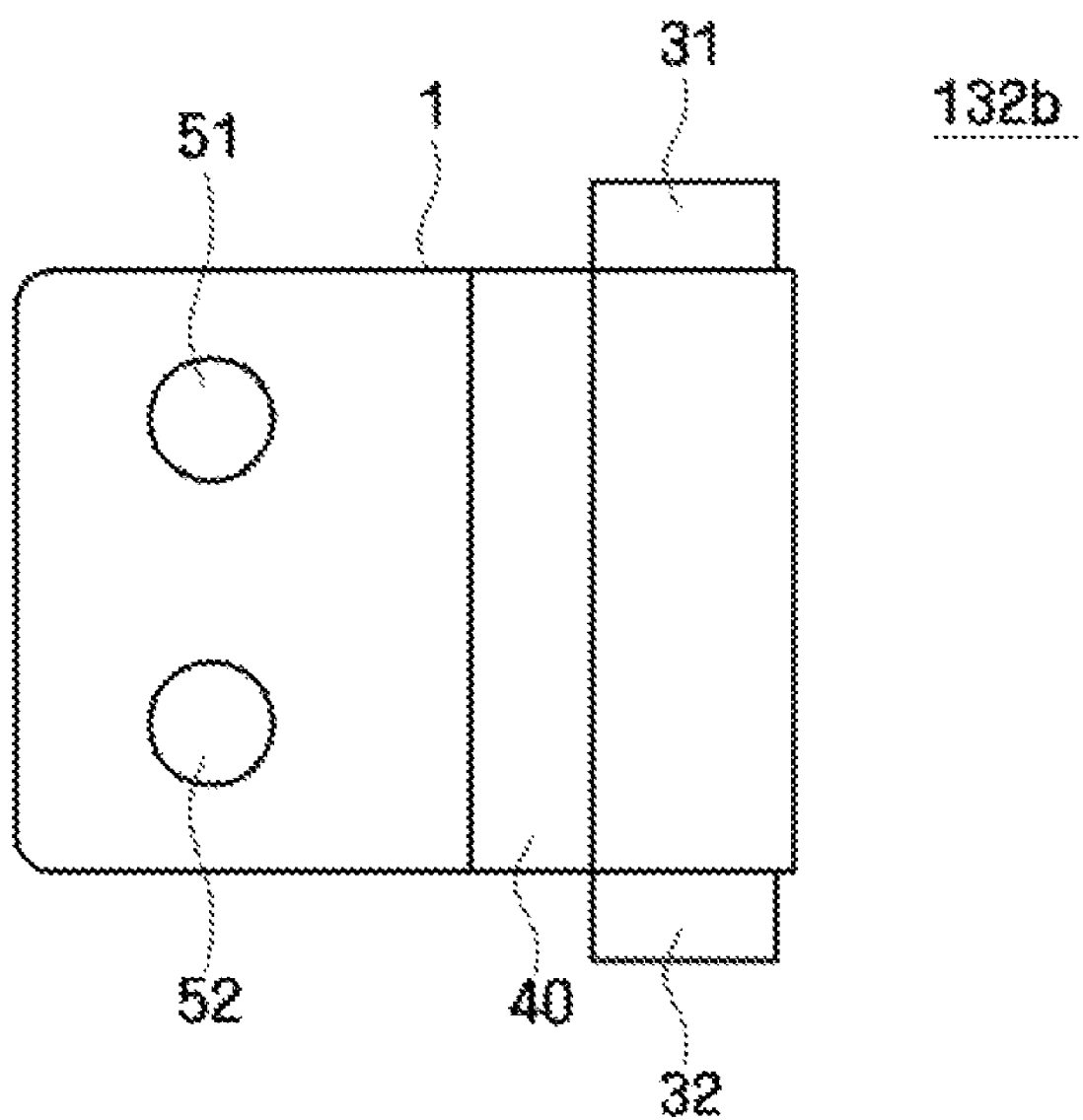
FIG. 7 is a side view of the holder shown in FIG. 6.
Figure 8:
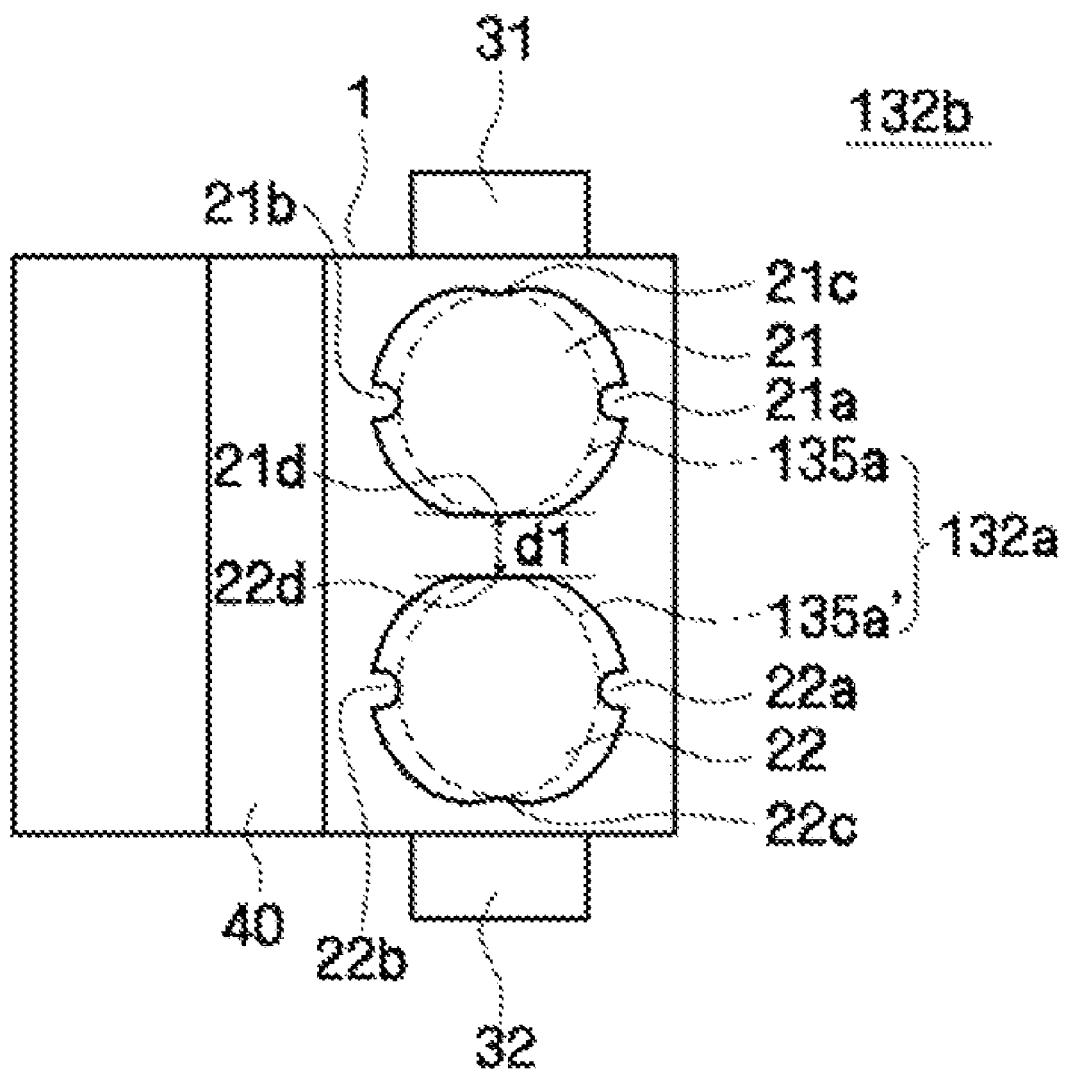
FIG. 8 is a front view of the holder shown in FIG. 6.
Figure 9:
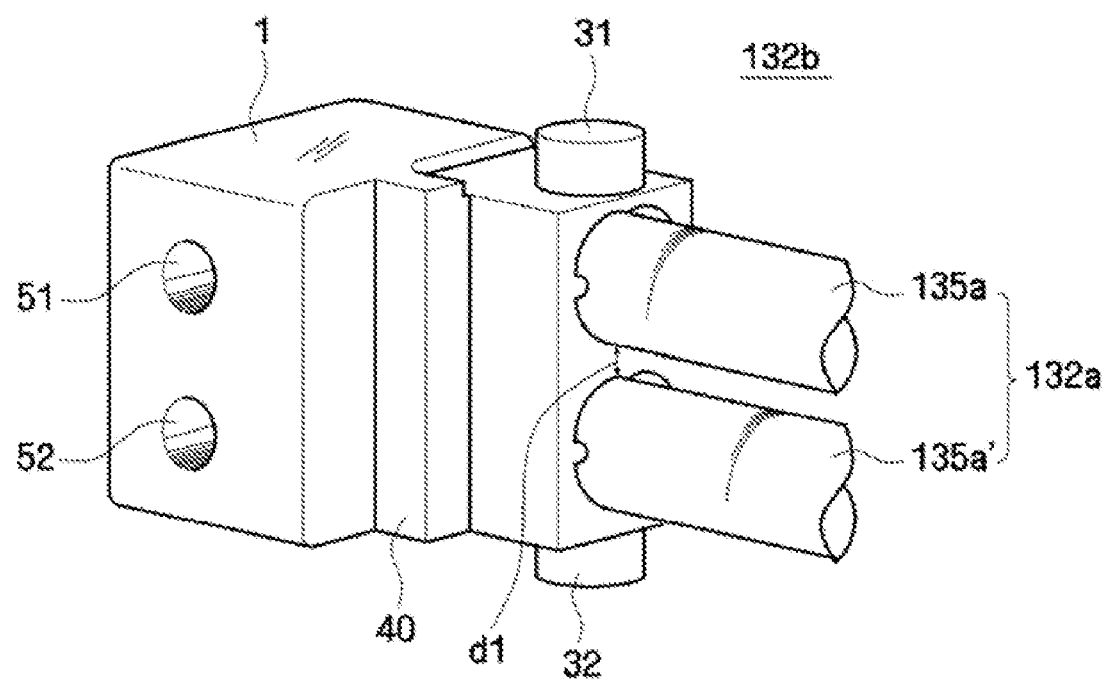
FIG. 9 is a partial perspective view of the holder of FIG. 6 to which the first and second lamps are coupled.

FIG. 6 is a perspective view of one of the end holders 132b of the backlight assembly 190 according to the first exemplary embodiment of the present disclosure. FIG. 7 is a side view of the holder 132b shown in FIG. 6. FIG. 8 is a front view of the holder 132b shown in FIG. 6. FIG. 9 is a partial perspective view of the holder 132b of FIG. 6 to which the first and second lamps 132a and 132a' are shown to be operatively coupled.

Referring to FIGS. 6 through 9, the end holder 132b comprises a body 1, first and second insertion grooves 21 and 22, fixing protrusions 31 and 32, an LGP guide part 40, and wire holes 51 and 52.

The first and second insertion grooves 21 and 22 are shaped and dimensioned (e.g., as substantially matching cylindrical surfaces) respectively fix the first and second lamps 135a and 135a' of the lamp part 132a to the body 1 of the holder 132b.

Specifically, the first insertion groove 21 includes three contact protrusions 21a through 21c which securely fix an end of the first lamp 135a to a precision located contacting surface 21d of the first insertion groove 21. In addition, the second insertion groove 22 comprises three contact protrusions 22a through 22c which securely fix an end of the second lamp 135a' to an opposed and precision located contacting surface 22d of the second insertion groove 22. The minimal distance between the precision located contacting surfaces, 21d-22d, is denoted as d1. Therefore, the first and second lamps 135a and 135a' are fixed to the body 1 of the end holder 132b so as to be spaced apart there by the distance d1.

The first and second insertion grooves 21 and 22 may be shaped like the outside of the first and second lamps 135a and 135a' such that respective ends of the first and second lamps 135a and 135a' are simultaneously inserted into the first and second insertion grooves 21 and 22 and thus effectively fixed to the body 1 of the holder 132b.

The number of the first and second insertion grooves 21 and 22 may be equal to the number of lamps comprised in the lamps group part 132a.

In one embodiment, the first gap distance, d1 between the first and second insertion grooves 21 and 22 is made substantially equal to a predetermined end gap desired between the ends of the first and second lamps 135a and 135a' as fixed by the end holder 132b. This is because each of the first and second lamps 135a and 135a' is securely fixed to the surface 21d or 22d by the three contact protrusions 21a through 21c or 22a through 22c of the first or second insertion groove 21 or 22.

That is, the first gap distance d1 may be a minimal distance between the first and second insertion grooves 21 and 22 and, at the same time, an electrical gap between the first and second lamps 135a and 135a' as fixed by the holder 132b.

The fixing protrusions 31 and 32 may be used to fix the end holder 132b to the lower housing 170 (see FIG. 1). The fixing protrusions 31 and 32 may be formed respectively on upper and lower surfaces of the body 1. Mating coupling parts (not shown) are formed on the lower housing 170 at locations corresponding to those of the fixing protrusions 31 and 32 and are coupled to the fixing protrusions 31 and 32, respectively.

The LGP guide part 40 may be formed to prevent the LGP 141 (see FIG. 1) from being pushed toward the lamp part 132a (see FIG. 1).

The wire holes 51 and 52 allow lamp wires (not shown), which are electrically connected to lead lines (not shown) formed at an end of the lamp part 132a (see FIG. 1), to come out of the holder 132b and thereafter attach to an appropriate electrical power supply (e.g., inverter).

Specifically, the lead lines (not shown) formed at an end of the lamp part 132a (see FIG. 1) are electrically connected to the lamp wires (not shown) by, e.g., soldering within the holder 132b. The lamp wires (not shown) electrically connected to the lead lines of the lamp part 132a (see FIG. 1) come out of the holder 132b through the wire holes 51 and 52.

The holder 132b may be made of an electrically insulative silicone material.

The backlight assembly 190 according to the first exemplary embodiment will now be described with reference to FIGS. 10 through 12.

Figure 10:
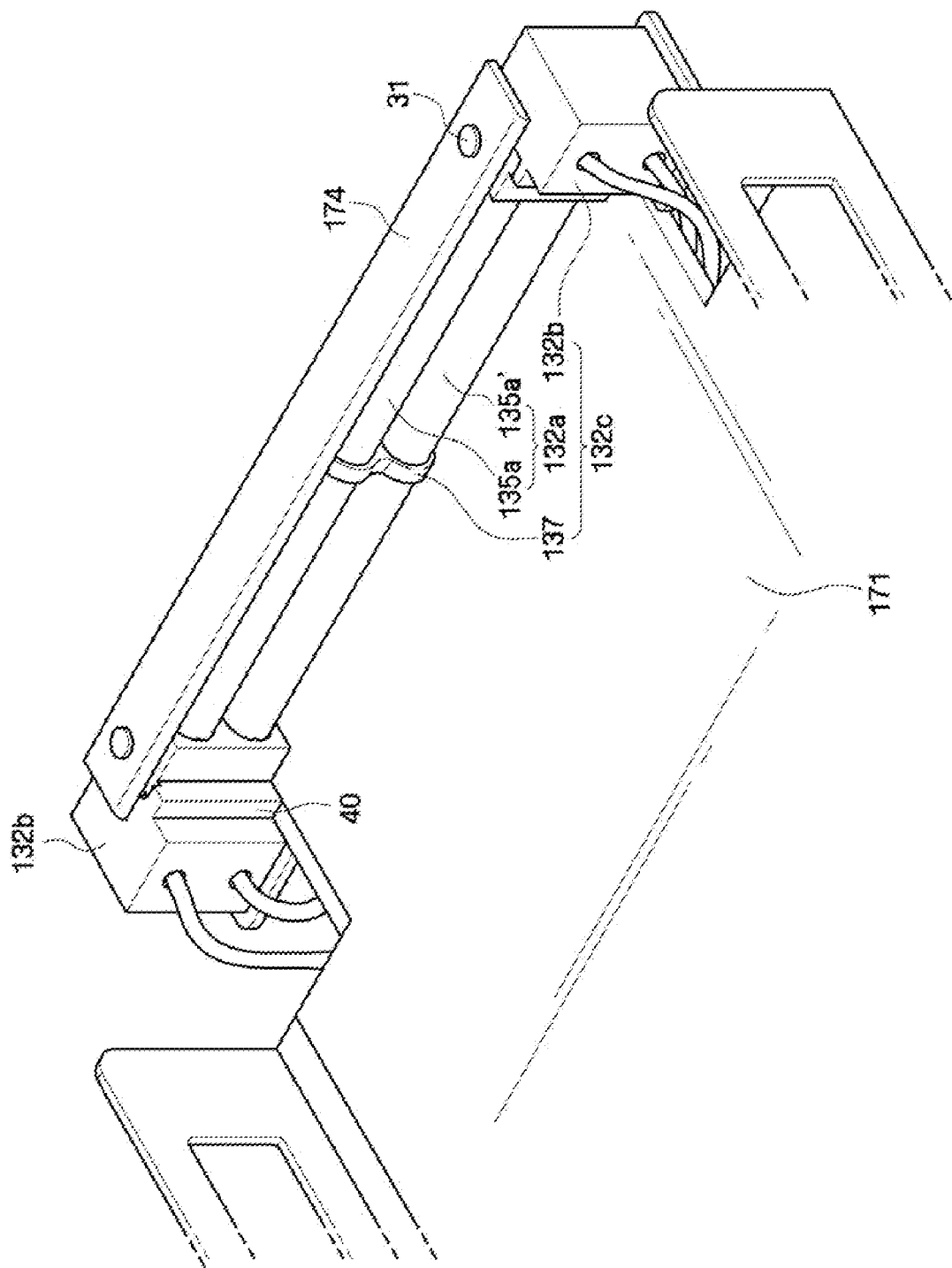
FIG. 10 is a schematic view of the backlight assembly, in which the first and second lamps, the holders, and the fixing part are coupled to each other, according to the first exemplary embodiment.

FIG. 10 is a schematic view of the backlight assembly 190, in which the first and second lamps 135a and 135a', the holders 132b, and the distance-fixing part 137 are coupled to each other, according to the first exemplary embodiment of the present disclosure. FIG. 11 is a side view of the backlight assembly 190 shown in FIG. 10. FIG. 12 is a diagram illustrating the noise reduction effect of the backlight assembly 190 according to the first exemplary embodiment of the present disclosure.

Referring to FIG. 10, in the backlight assembly 190 (see FIG. 1) according to the first exemplary embodiment, the first and second lamps 135a and 135a' are fixed between the two end holders 132b, and the distance-fixing part 137 is disposed at a desired location along overlapping portions of the first and second lamps 135a and 135a', for example, in the middle of the lengths of the first and second lamps 135a and 135a' so as to fix the first and second lamps 135a and 135a' in a desired position and separation distance (d2) at that location.

More specifically, both electrical ends of the first lamp 135a are inserted and fixed to the first insertion groove 21 (see FIG. 6) which is formed in each of the two holders 132b, and both electrical ends of the second lamp 135a' are inserted and fixed to the second insertion groove 22 (see FIG. 6) which is formed in each of the two holders 132b. In addition, the first lamp 135a is passed through the first through-hole 23 (see FIG. 3) of the distance-fixing part 137 and thus fixed to the distance-fixing part 137, and the second lamp 135a' is passed through the second through-hole 24 (see FIG. 3) of the distance-fixing part 137 and thus fixed to the distance-fixing part 137. As described above, the distance-fixing part 137 is disposed at a location along overlapping portions of the first and second lamps 135a and 135a', for example, in the middle of the first and second lamps 135a and 135a' to fix the first and second lamps 135a and 135a' in position.

While two holders 132b are shown in FIG. 10 as an example, the present disclosure is not limited to this example.

Figure 11:
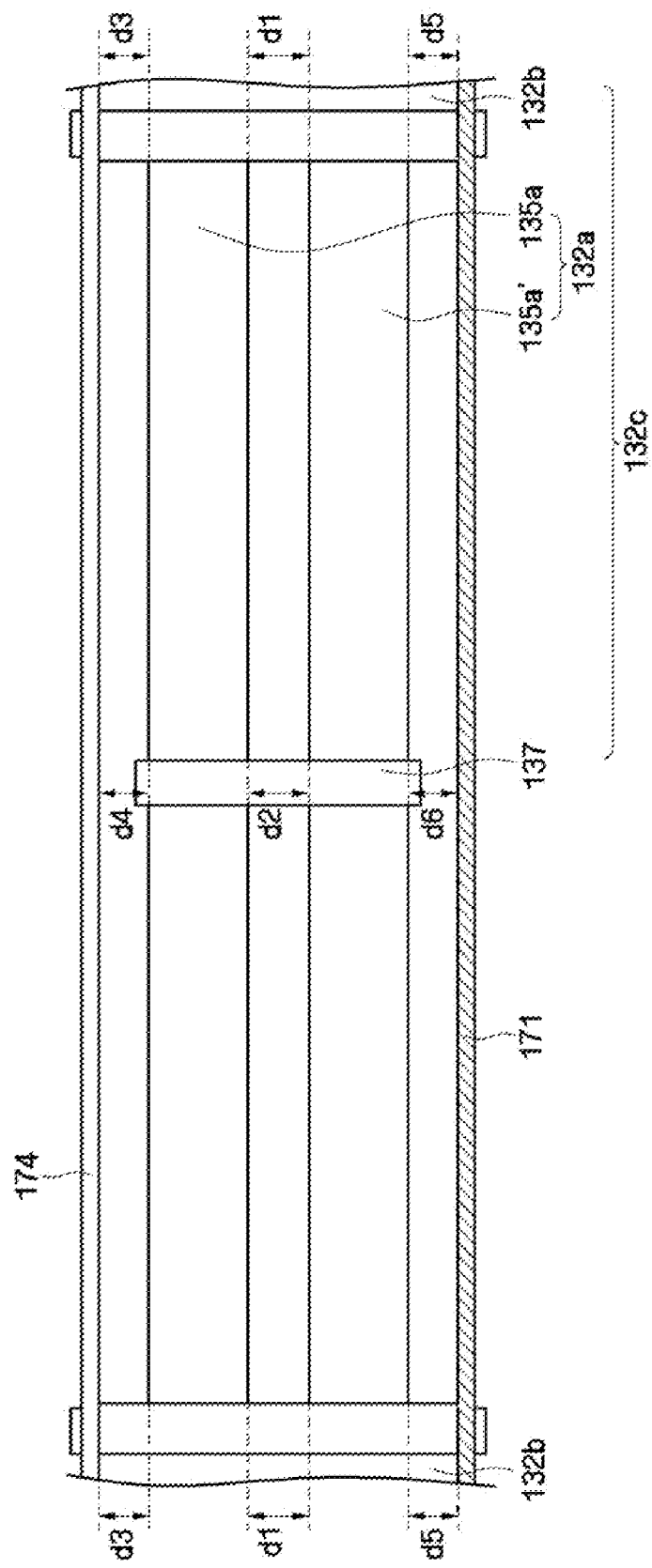
FIG. 11 is a side view of the backlight assembly shown in FIG. 10.

Referring to FIG. 11, in one embodiment, the second gap distance d2 between the first and second through-holes 23 and 24 (see FIG. 3) formed in the distance-fixing part 137 is smaller than the first gap distance d1 between the first and second insertion grooves 21 and 22 (see FIG. 6) formed in each of the holders 132b.

As mentioned above when describing one of the holders 132b, the first gap distance d1 may be equal to a desired and predetermined first electrical separation gap between ends of the first and second lamps 135a and 135a' as fixed by the end holders 132b. Therefore, the first and second lamps 135a and 135a' may be separated from each other at their extreme ends by the first gap distance d1 and they may extend substantially parallel to each other in between.

In addition, as mentioned above when describing the distance-fixing part 137, the second gap distance d2 may be made equal to a desired and predetermined second electrical separation gap between the first and second lamps 135a and 135a' as fixed by the distance-fixing part 137, where the second gap distance d2 may be made to be smaller or larger than the first gap distance d1, as deemed appropriate for a given type of respective lamp.

Therefore, in one embodiment, the second gap distance d2 between the first and second lamps 135a and 135a' fixed by the distance-fixing part 137 is made smaller than the first gap distance d1 between the first and second lamps 135a and 135a' fixed by the holders 132b.

Specifically, the second gap distance d2 may be between 99% to about 75% of the distance defined by the first gap distance d1. For example, in one embodiment, the first gap distance d1 is about 0.8 mm, and the second gap distance d2 is about 0.6 mm (in other words, 75% of d1). However, the present disclosure is not limited to this example. The first and second gap distances d1 and d2 may vary according to a change in diameters or other characteristics of the first and second lamps 135a and 135a'.

If the second gap distance d2 is between 99% to about 75% of the distance defined by the first gap distance d1, the gap between the first and second lamps 135a and 135a' at their midpoints is reduced relative to the spacing apart at their end points. The reduced gap allows the first and second lamps 135a and 135a' to interact with each other at their midpoints, thereby increasing noise and possibly generating a corona discharge at the midpoints rather than near the longitudinal ends of the lamps. The probable locations of these electrical anomalies are thereby moved substantially maximally away from the attachment locations of the wires by which the lamps electrically couple to the system lamp drivers. Accordingly, the source points of electrical noise or discharge energies that generally tend to be generated at the spot of minimal separation between the lamps is thus distanced away from the lamp wires. As a result, the reliability of the display device can be improved over devices where the location of potential electrical noise or discharge is not controlled.

If the second gap distance d2 is greater than the first gap distance d1, then the gap between the first and second lamps 135a and 135a' at their midpoints is undesirably increased. The increased gap may cause the first and second lamps 135a and 135a' to electrically interact with the top plates 174 and the bottom plate 171 of the lower housing 170 rather than with each other, thereby increasing electrical noise.

A fourth gap d4 may be defined as shown in FIG. 11 between the midpoint of the first lamp 135a where it is fixed by the distance-fixing part 137 and each of the top plates 174 of the lower housing 170 so that this fourth gap d4 is larger than a third gap d3 defined at the ends of lamp between the first lamp 135a fixed by the holders 132b and each of the top plates 174 of the lower housing 170.

Specifically, the fourth gap d4 should be about 133% to 101% times the distance defined by the third gap d3. For example, the third gap d3 may be 0.3 mm, and the fourth gap d4 may be 0.4 mm. However, the present disclosure is not limited to this example. The third and fourth gaps d3 and d4 may vary according to a change in the diameters or other characteristics of the first and second lamps 135a and 135a'.

If the fourth gap d4 is less than one time the third gap d3, the gap between the first and second lamps 135a and 135a' is undesirably increased. The increased gap may cause the first lamp 135a to electrically interact with each of the top plates 174 of the lower housing 170, thereby increasing electrical noise in the system.

However, if the fourth gap d4 is between about 133% to 101% times the distance defined by the third gap d3, coupling of electrical noise from the midpoints of the first and second lamps 135a and 135a' to the surrounding metal plates (e.g., 174) is reduced. The reduced gap causes the first and second lamps 135a and 135a' to preferably interact only with each other at their midpoints, thereby reducing coupling of electrical noise to, and reducing danger of corona discharge to the surrounding conductive parts of the system. As a result, the reliability of the display device can be improved over devices in which the location of interaction and/or discharge is not so controlled.

Similarly, a sixth gap d6 between the second lamp 135a' fixed by the distance-fixing part 137 and the bottom plate 171 of the lower housing 170 is larger than a fifth gap d5 between the second lamp 135a' fixed by the holders 132b and the bottom plate 171 of the lower housing 170.

Specifically, the sixth gap d6 may be about 133% to 101% times the distance defined by the fifth gap d5 of FIG. 11. For example, the fifth gap d5 may be 0.3 mm, and the sixth gap d6 may be 0.4 mm. However, the present disclosure is not limited to this example. The fifth and sixth gaps d5 and d6 may vary according to a change in the diameters or other characteristics of the first and second lamps 135a and 135a'.

The electrical noise reducing effects of the backlight assembly 190 according to the first exemplary embodiment will now be described with reference to FIG. 12.

Figure 12:
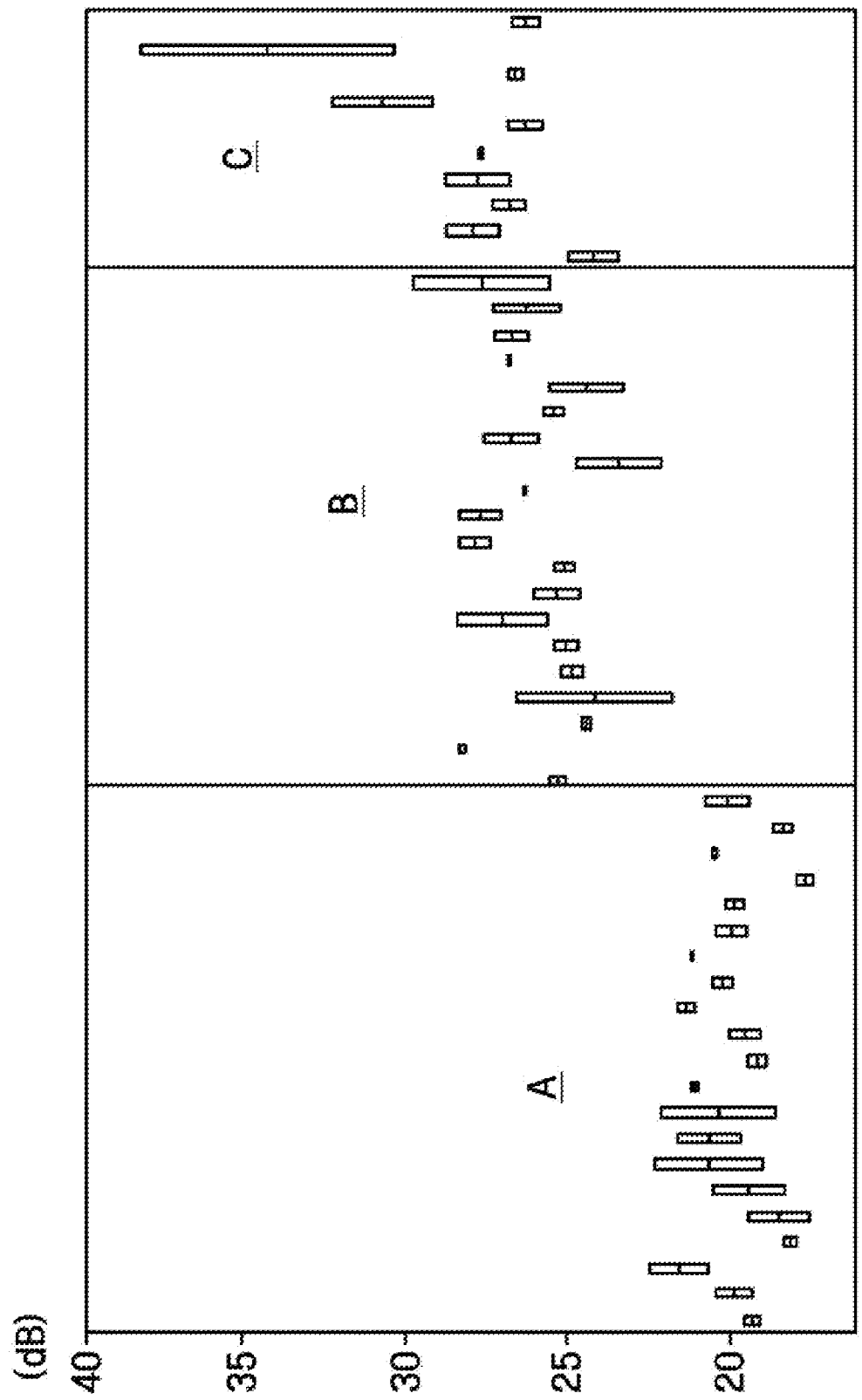
FIG. 12 is a diagram illustrating the noise reduction effect of the backlight assembly according to the first exemplary embodiment.

FIG. 12 is a diagram illustrating the noise reduction effect of the backlight assembly 190 according to the first exemplary embodiment of the present disclosure. In FIG. 12, noise measurement data is presented in the form of a box plot (bars each showing range and average level). The X-axis represents the number of experiments conducted for each of experimental groups A, B and C, and the Y-axis represents noise measurement data.

Referring to FIG. 12, noise measurement data of the backlight assembly 190 in which the second gap distance d2 is 3/4 times the first gap distance d1 and the fourth and sixth gaps d4 and d6 are 4/3 times the third and fifth gaps d3 and d5 is plotted in graph region A.

Specifically, the results data graph of region A illustrates the noise measurements data obtained from use of a backlight assembly in accordance with embodiment 190 in which the first gap distance d1 is 0.8 mm, the second gap distance d2 is 0.6 mm, the third and fifth gaps d3 and d5 are 0.3 mm, and the fourth and sixth gaps d4 and d6 are 0.4 mm.

Noise measurement data of each backlight assembly, in which the second, fourth and sixth gaps d2, d4 and d6 are equal respectively to the first, third and fifth gaps d1, d3 and d5, is plotted in graph regions B and C.

Specifically, the graph B illustrates the noise measurement data of the backlight assembly in which the first and second gap distances d1 and d2 are 0.8 mm and the third through sixth gaps d3 through d6 are 0.3 mm. In addition, the graph C illustrates the noise measurement data of the backlight assembly in which the first and second gap distances d1 and d2 are 0.6 mm and the third through sixth gaps d3 through d6 are 0.4 mm.

It can be understood from the comparison of graph region A with the graph regions B and C that the backlight assembly 190 in which the second gap distance d2 is 3/4 times the first gap distance d1 and the fourth and sixth gaps d4 and d6 are 4/3 times the third and fifth gaps d3 and d5 exhibited less electrical noise (measured in decibels) than the backlight assemblies in which the second, fourth and sixth gaps d2, d4 and d6 are equal respectively to the first, third and fifth gaps d1, d3 and d5.

Specifically, if a mean value of noise levels of each experimental group presented in a box plot is compared with those of the other experimental groups, it can be understood that the mean value belonging to the graph A is substantially less than the mean values belonging to the graphs B and C. This is believed to be so because the interaction between ends of the first and second lamps 135a and 135a', between middles of the first and second lamps 135a and 135a' and the adjacent top plates 174, and between middles of the first and second lamps 135a and 135a' and the adjacent bottom plate 171 in the backlight assembly 190 according to the first exemplary embodiment has been minimized as described above.

As described above, the backlight assembly 190 (see FIG. 1) according to the first exemplary embodiment has reduced noise. In addition, since the interaction between ends the first and second lamps 135a and 135a' is minimized, a corona discharge generally does not occur near those ends, thereby enhancing reliability.

Hereinafter, a backlight assembly and a display device according to a second exemplary embodiment of the present disclosure will be described with reference to FIGS. 13 and 14. In the second exemplary embodiment, elements having the same functions as those of the first exemplary embodiment are indicated by like reference numerals, and thus their description will be omitted.

First, the backlight assembly according to the second exemplary embodiment of the present disclosure will now be described with reference to FIGS. 13 and 14.

Figure 13:
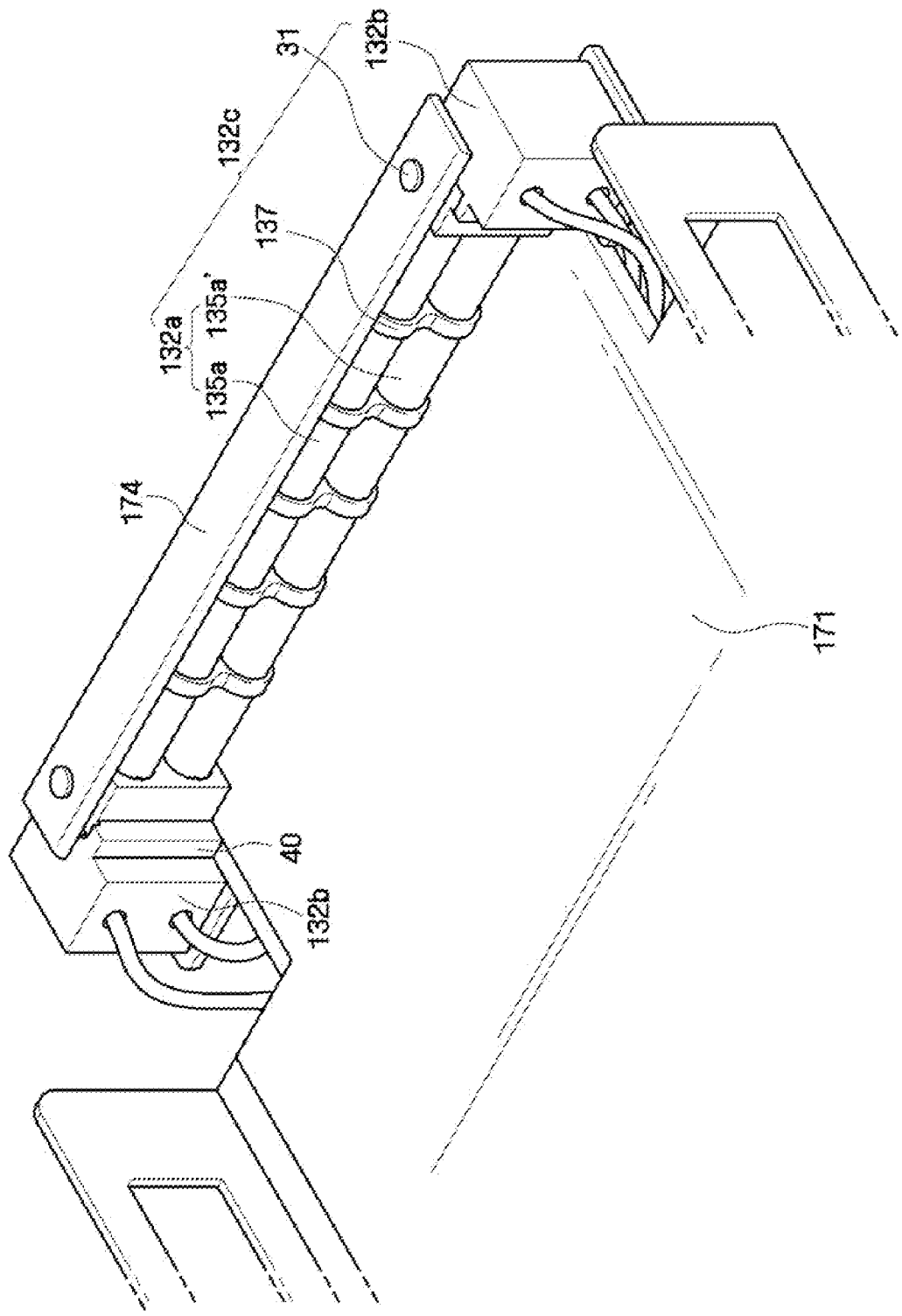
FIG. 13 is a schematic view of a backlight assembly, in which first and second lamps, holders, and two or more distance-fixing parts are coupled to each other, according to a second exemplary embodiment.

FIG. 13 is a schematic view of a backlight assembly 190 (see FIG. 1), in which first and second lamps 135a and 135a', holders 132b, and two or more distance-fixing parts 137 are coupled to each other, according to a second exemplary embodiment of the present disclosure. FIG. 14 is a side view of the backlight assembly 190 shown in FIG. 13.

Referring to FIG. 13, in the backlight assembly 190 (see FIG. 1) according to the second exemplary embodiment, the first and second lamps 135a and 135a' are fixed between the two end holders 132b, and also between the five distance-fixing parts 137 where the latter are arranged at regular intervals along the lengths of the first and second lamps 135a and 135a' so as to fix the first and second lamps 135a and 135a' in desired positions at those intervals.

Specifically, both ends of the first lamp 135a are inserted and fixed to a first insertion groove 21 (see FIG. 6) which is formed in each of the two holders 132b, and both ends of the second lamp 135a' are inserted and fixed to a second insertion groove 22 (see FIG. 6) which is formed in each of the two holders 132b. In addition, the first lamp 135a is passed through a first through-hole 23 (see FIG. 3) of each of the five distance-fixing parts 137 and thus fixed to each of the distance-fixing parts 137, and the second lamp 135a' is passed through a second through-hole 24 (see FIG. 3) of each of the five distance-fixing parts 137 and thus fixed to each of the distance-fixing parts 137. As described above, the five distance-fixing parts 137 are arranged at regular intervals on the first and second lamps 135a and 135a' and fix the first and second lamps 135a and 135a' in position. That is, the distance-fixing parts 137 are separated from each other by the same gap L.

While two holders 132b are shown in FIG. 13 as an example, the present disclosure is not limited to this example.

In addition, in FIG. 13, the five distance-fixing parts 137 are arranged at regular intervals as an example. However, the present disclosure is not limited to this example. The number of the distance-fixing parts 137 may vary according to a change in the length of the first and second lamps 135a and 135a'.

Figure 14:
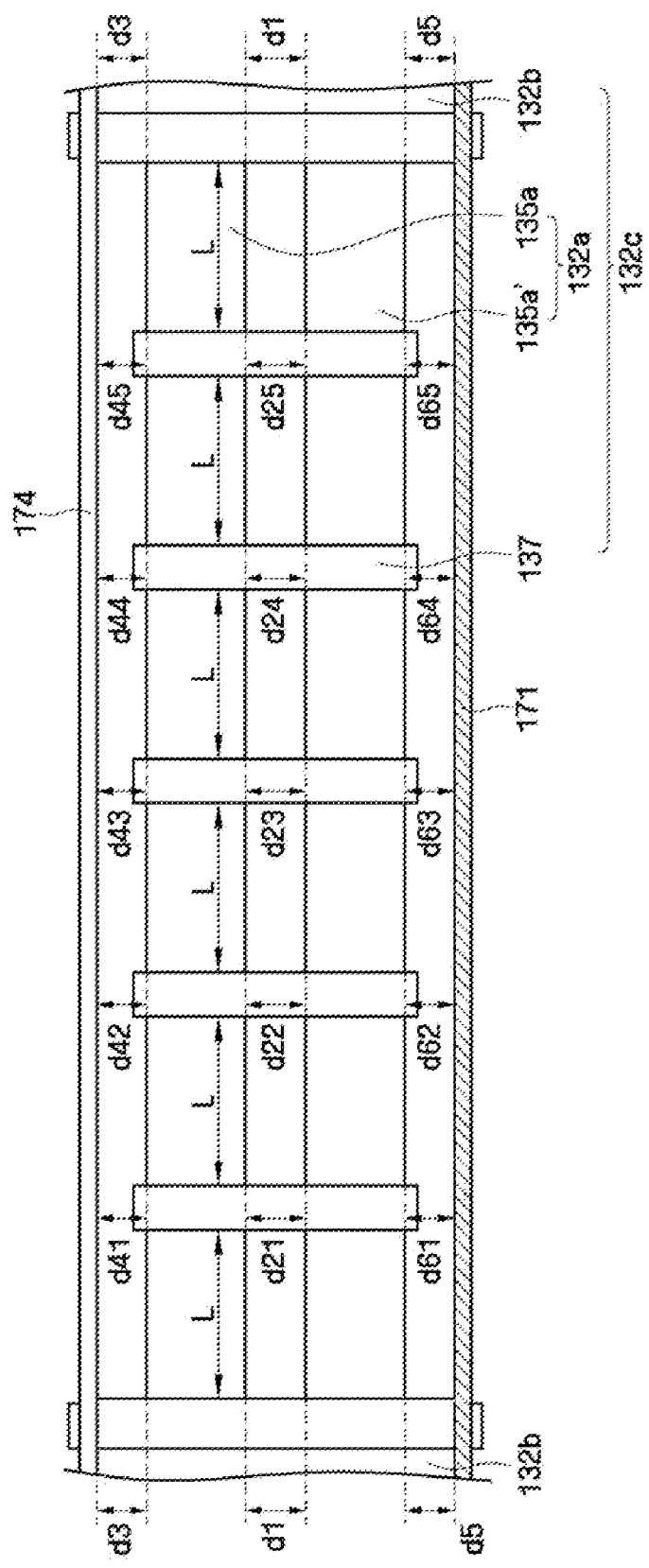
FIG. 14 is a side view of the backlight assembly shown in FIG. 13.

Referring to FIG. 14, second gap distances d21, d22, d23, d24, and/or d25 between the first and second through-holes 23 and 24 (see FIG. 3) are formed in each of the distance-fixing parts 137 so as to be smaller than a first gap distance d1 between the first and second insertion grooves 21 and 22 (see FIG. 6) formed in each of the holders 132b.

As mentioned above when describing one of the holders 132b, the first gap distance d1 may be equal to a gap between the first and second lamps 135a and 135a' fixed by the holders 132b. Therefore, the first and second lamps 135a and 135a' may be separated from each other by the first gap distance d1 and extend parallel to each other.

In addition, as mentioned above when describing one of the distance-fixing parts 137, the second gap distance d21, d22, d23, d24, or d25 may be equal to a gap between the first and second lamps 135a and 135a' fixed by the five distance-fixing parts 137.

Therefore, the second gap distance d21, d22, d23, d24, or 25 between the first and second lamps 135a and 135a' fixed by the five distance-fixing parts 137 may be smaller than the first gap distance d1 between the first and second lamps 135a and 135a' fixed by the holders 132b.

The second gap distances d21 through d25 between the first and second through-holes 23 and 24 formed in the five distance-fixing parts 137 may be equal to or different from each other as long as each of the second gap distances d21 through d25 is between about 75% to about 99% of the distance defined by the first gap distance d1.

Specifically, when the first gap distance d1 is 0.8 mm, the second gap distances d21 through d25 may all be 0.6 mm. Alternatively, there may be a gradual change between the second gap distances d21 through d25. For example, the second gap distances d21 through d25 may be 0.75 mm, 0.65 mm, 0.6 mm, 0.65 mm, and 0.75 mm, respectively. However, the present disclosure is not limited to this example. The first gap distance d1 and the second gap distances d21 through d25 may vary according to a change in diameters or other characteristics of the first and second lamps 135a and 135a'.

Fourth gap distances, d41, d42, d43, d44, or d45 between the first lamp 135a and respective points on top plate 174, as respectively fixed by the five distance-fixing parts 137 are each preferably made larger than a third gap distance d3 present between ends of the first lamp 135a as fixed by the holders 132b and the top plate 174 of the lower housing 170.

The fourth gap distances, d41, d42, d43, d44, or d45 may be each made to be between more than about one times the third gap distance d3 and about 4/3 times the distance of the third gap d3.

If the fourth gap d41, d42, d43, d44, or d45 is less than one time the third gap d3, the gap between the first and second lamps 135a and 135a' is increased. The increased gap may cause the first lamp 135a to interact with each of the top plates 174 of the lower housing 170, thereby increasing noise.

If any of the fourth gap distances, d41, d42, d43, d44, or d45 is more than about 4/3 times the third gap distance d3, the gap between the first and second lamps 135a and 135a' may be reduced at uncontrolled points along their lengths. This reduced gap may cause the first and second lamps 135a and 135a' to disadvantageously interact more often with each other at uncontrolled points along their lengths, thereby increasing electrical noise and/or the coupling of corona discharge energies to metal parts of the system. As a result, the reliability of the display device may be reduced if the fourth gap distances, d41-d45 are made too large (e.g., substantially more than 4/3 times d3).

Therefore, the fourth gap distances, d41, d42, d43, d44, or d45 should each be between about one times the third gap distance d3 and 4/3 times the third gap distance d3.

Similarly, a sixth gap d61, d62, d63, d64, or d65 between the second lamp 135a' fixed by the five distance-fixing parts 137 and the bottom plate 171 of the lower housing 170 is larger than a fifth gap d5 between the second lamp 135a' fixed by the holders 132b and the bottom plate 171 of the lower housing 170.

The sixth gap d61, d62, d63, d64, or d65 may be between about 133% to about 101% of the distance defined by the fifth gap d5.

If the sixth gap d61, d62, d63, d64, or d65 is more than 4/3 times the fifth gap d5, the gap between the first and second lamps 135a and 135a' along their lengths is reduced relative to the electrical gap present at their ends. The reduced gap causes the first and second lamps 135a and 135a' to interact with each other along the middle parts of their lengths, thereby increasing probability of noise and generating a corona discharge there while reducing it elsewhere. As a result, the reliability of the display device can be improved.

The display device according to the second exemplary embodiment is substantially identical to the display device according to the first exemplary embodiment except that it comprises the above-described backlight assembly 190 (see FIG. 1) according to the second exemplary embodiment, instead of the backlight assembly 190 (see FIG. 1) according to the first exemplary embodiment. Therefore, other elements of the display device according to the second exemplary embodiment are identical to those of the first exemplary embodiment described above, and thus a detailed description thereof is omitted.

Hereinafter, a backlight assembly and a display device according to a third exemplary embodiment of the present disclosure will be described with reference to FIGS. 15 and 16. In the third exemplary embodiment, elements having the same functions as those of the second exemplary embodiment are indicated by like reference numerals, and thus their description will be omitted.

First, the backlight assembly according to the third exemplary embodiment of the present disclosure will be described with reference to FIGS. 15 and 16.

Figure 15:
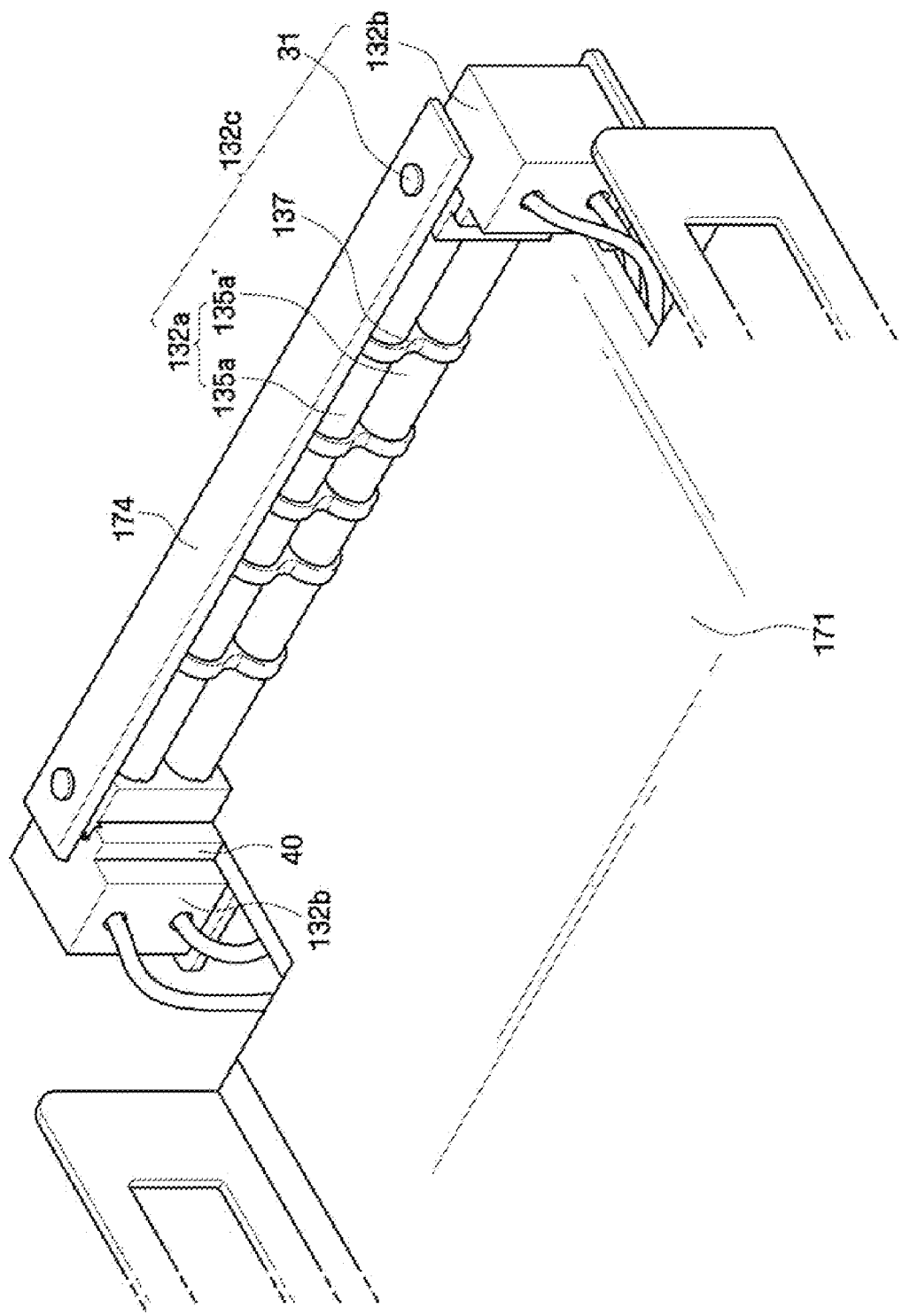
FIG. 15 is a schematic view of a backlight assembly, in which first and second lamps, holders, and two or more distance-fixing parts are coupled to each another, according to a third exemplary embodiment.

FIG. 15 is a schematic view of a backlight assembly 190 (see FIG. 1), in which first and second lamps 135a and 135a', holders 132*b*, and two or more distance-fixing parts 137 are coupled to each another, according to a third exemplary embodiment of the present disclosure. FIG. 16 is a side view of the backlight assembly 190 shown in FIG. 15.

Figure 16:
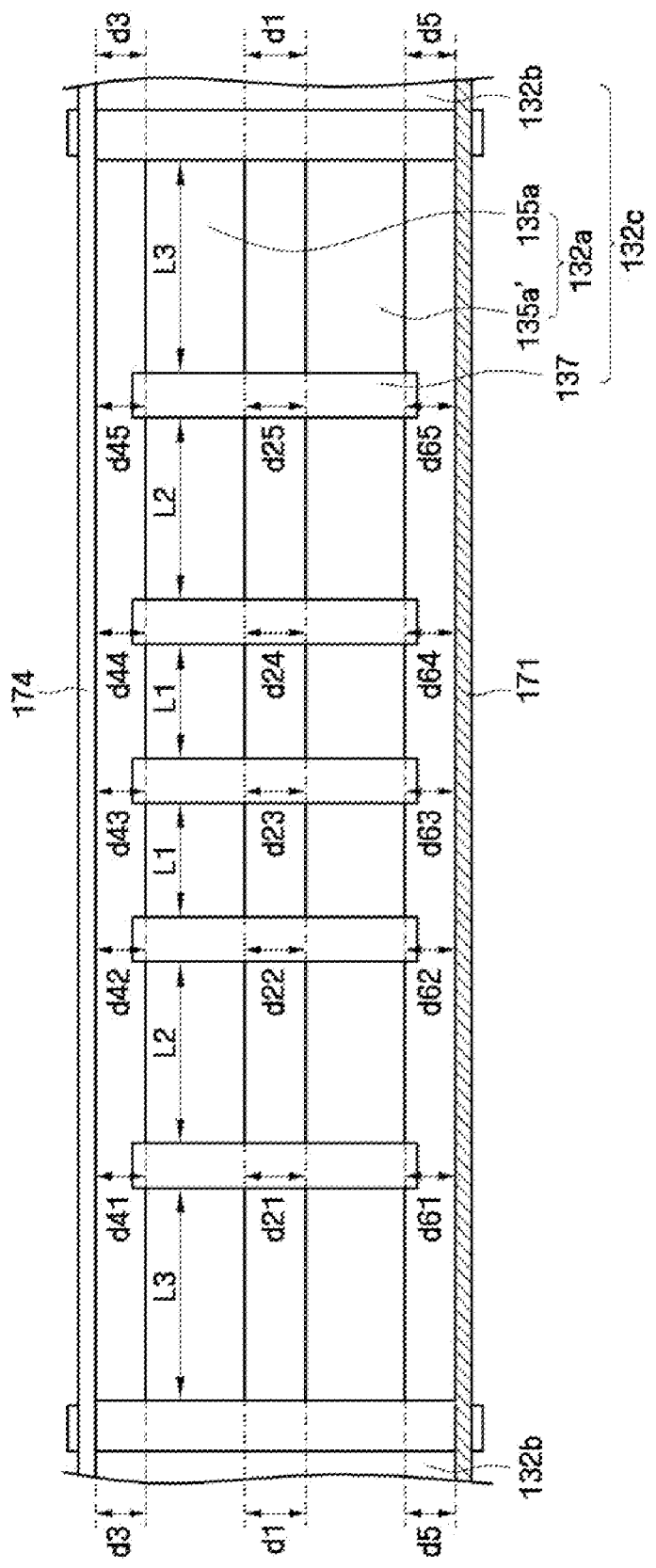
FIG. 16 is a side view of the backlight assembly shown in FIG. 15.

Referring to FIGS. 15 and 16, in the backlight assembly 190 (see FIG. 1) according to the third exemplary embodiment, the first and second lamps 135*a* and 135*a*' are fixed between the two holders 132*b*, and the five distance-fixing parts 137 are arranged at predetermined graduated intervals (not all regular intervals) along the first and second lamps 135*a* and 135*a*' to fix the first and second lamps 135*a* and 135*a*' in position.

Specifically, both ends of the first lamp 135*a* are inserted and fixed to a first insertion groove 21 (see FIG. 6) which is formed in each of the two holders 132*b*, and both ends of the second lamp 135*a*' are inserted and fixed to a second insertion groove 22 (see FIG. 6) which is formed in each of the two holders 132*b*. In addition, the first lamp 135*a* is passed through a first through-hole 23 (see FIG. 3) of each of the five distance-fixing parts 137 and thus fixed to each of the five distance-fixing parts 137, and the second lamp 135*a*' is passed through a second through-hole 24 (see FIG. 3) of each of the five distance-fixing parts 137 and thus fixed to each of the five distance-fixing parts 137. The five distance-fixing parts 137 are arranged at predetermined gradation intervals on the first and second lamps 135*a* and 135*a*' and fix the first and second lamps 135*a* and 135*a*' in position.

That is, there may be a predetermined gradation in gaps L1 through L3 (FIG. 16) between the distance-fixing parts 137. For example, the gap L3 may be twice the gap L2, and the gap L2 may be twice the gap L1. However, the present disclosure is not limited to this example. While the gap L3 is largest in FIG. 16, this is merely an example. When necessary, the gap L1 may be largest.

Other elements of the backlight assembly according to the third exemplary embodiment are identical to those of the backlight assembly according to the second exemplary embodiments described above, and thus a detailed description thereof will be omitted.

When the first and second lamps 135*a* and 135*a*', the two holders 132*b*, and the five distance-fixing parts 137, which are arranged at predetermined gradation intervals, are disposed as described above according to the third exemplary embodiment, the interaction between the first and second lamps 135*a* and 135*a*' at their ends, between the first and second lamps 135*a* and 135*a*' and the adjacent top plates 174 of a lower housing 170, and between the first and second lamps 135*a* and 135*a*' and the adjacent bottom plate 171 of the lower housing 170 are minimized The minimized interaction reduces noise and enhances reliability.

The display device according to the third exemplary embodiment is identical to the display device according to the first exemplary embodiment except that it comprises the above-described backlight assembly 190 (see FIG. 1) according to the third exemplary embodiment, instead of the backlight assembly 190 (see FIG. 1) according to the first exemplary embodiment. Therefore, other elements of the display device according to the third exemplary embodiment are identical to those of the first exemplary embodiment described above, and thus a detailed description thereof is omitted.

Hereinafter, a backlight assembly and a display device according to a fourth exemplary embodiment of the present disclosure will be described with reference to FIGS. 17 through 19. In the fourth exemplary embodiment, elements having the same functions as those of the first exemplary embodiment are indicated by like reference numerals, and thus their description will be omitted.

First, the backlight assembly according to the fourth exemplary embodiment of the present disclosure will be described with reference to FIGS. 17 through 19.

Figure 17:
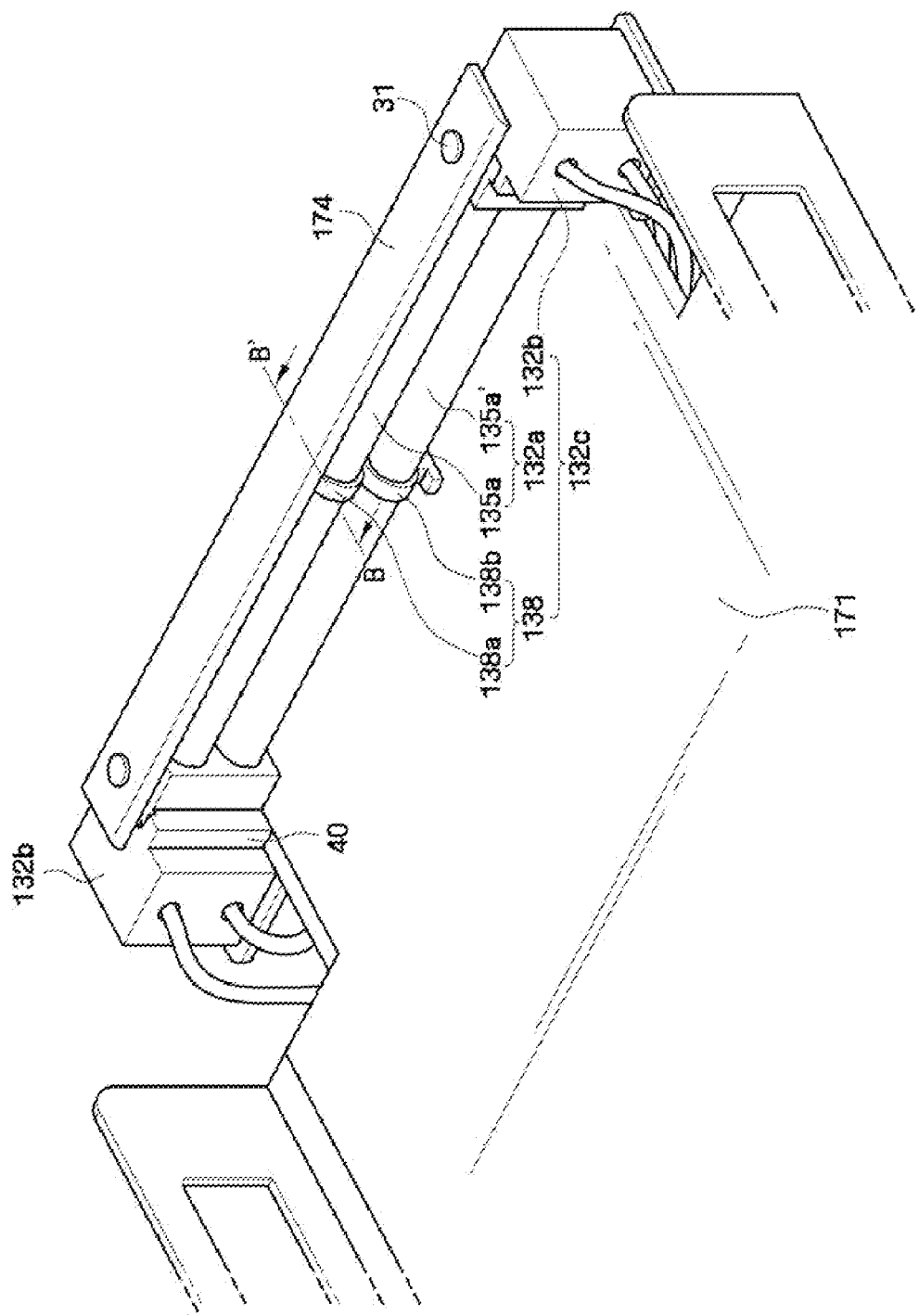
FIG. 17 is a schematic view of a backlight assembly, in which first and second lamps, holders, and a distance-fixing part are coupled to each other, according to a fourth exemplary embodiment.

FIG. 17 is a schematic view of a backlight assembly 190 (see FIG. 1), in which first and second lamps 135*a* and 135*a*', holders 132*b*, and a distance-fixing part 138 are coupled to each other, according to a fourth exemplary embodiment of the present disclosure. FIG. 18 is a cross-sectional view of the backlight assembly 190 taken along the line B-B' of FIG. 17. FIG. 19 is a side view of the backlight assembly 190 shown in FIG. 17.

Figure 18:
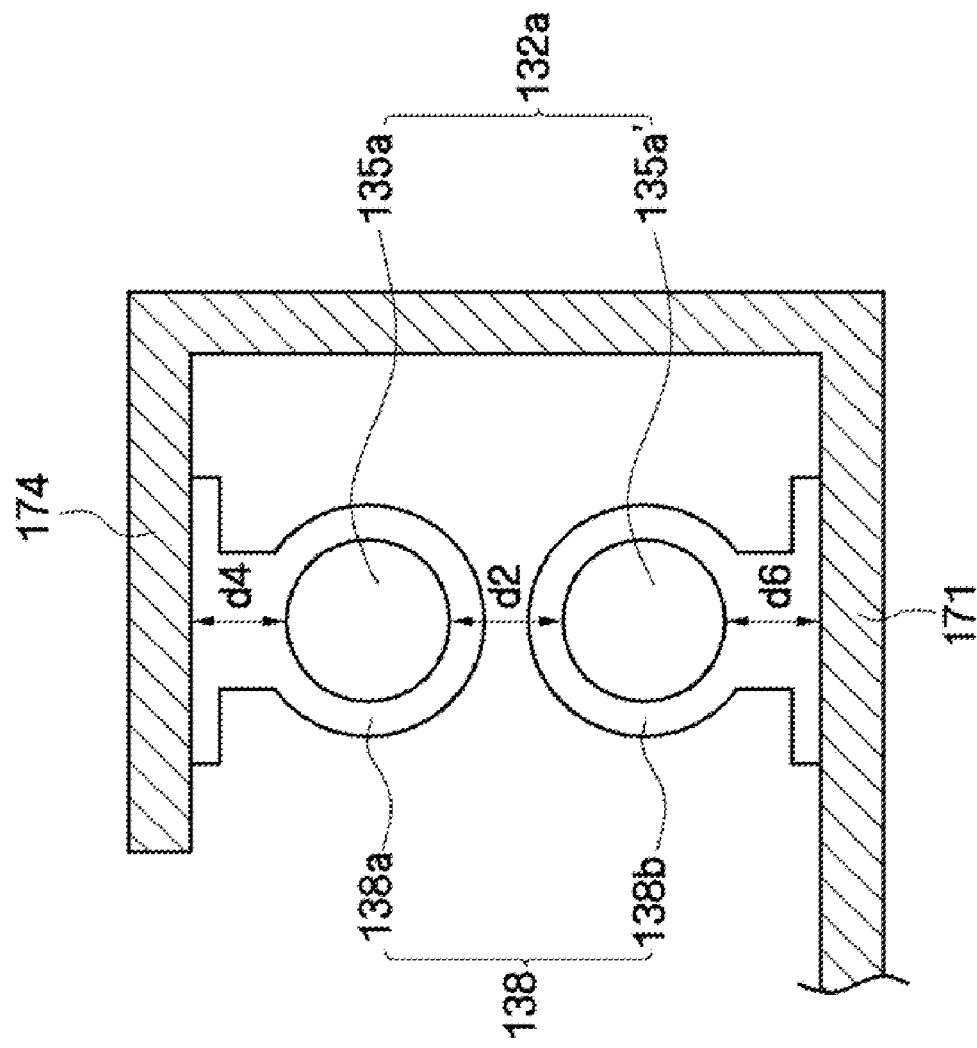
FIG. 18 is a cross-sectional view of the backlight assembly taken along the line B-B' of FIG. 17.
Figure 19:
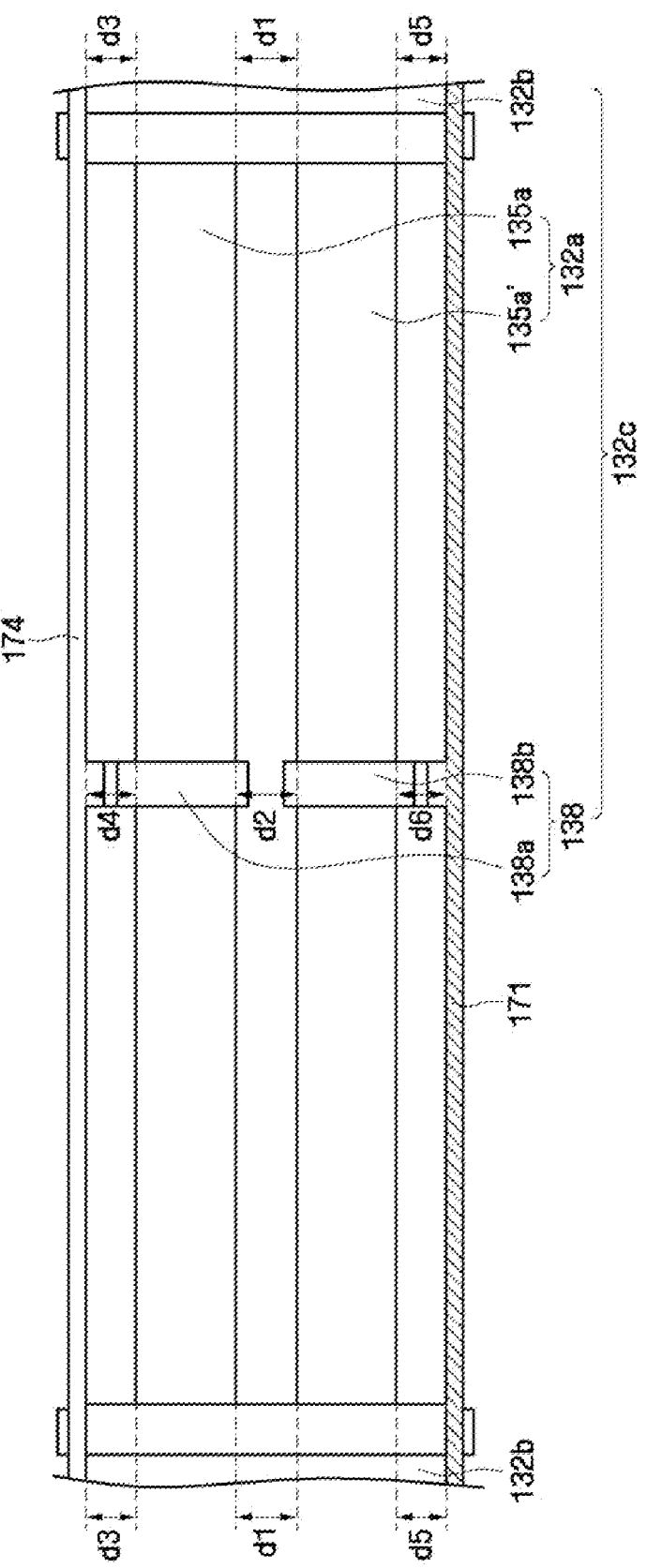
FIG. 19 is a side view of the backlight assembly shown in FIG. 17.

Referring to FIGS. 17 through 19, in the backlight assembly 190 (see FIG. 1) according to the fourth exemplary embodiment, the first and second lamps 135*a* and 135*a*' are fixed between the two holders 132*b*, and the distance-fixing part 138 is disposed in the middle of the first and second lamps 135*a* and 135*a*' to fix the first and second lamps 135*a* and 135*a*' in position.

Specifically, both ends of the first lamp 135*a* are inserted and fixed to a first insertion groove 21 (see FIG. 6) which is formed in each of the two holders 132*b*, and both ends of the second lamp 135*a*' are inserted and fixed to a second insertion groove 22 (see FIG. 6) which is formed in each of the two holders 132*b*.

The distance-fixing part 138 comprises a first fixing part 138*a* fixed to each of top plates 174 of a lower housing 170 and a second fixing part 138*b* fixed to a bottom plate 171 of the lower housing 170 by the illustrated spacers that have respective spacings dimensions d4 and d6. The first and second fixing parts 138*a* and 138*b* may be separated from each other by air, or a further electrically insulative spacer (not shown) may be provided between them.

The first lamp 135*a* is passed through the first fixing part 138*a* and thus fixed to the first fixing part 138*a*, and the second lamp 135*a*' is passed through the second fixing part 138*b* and thus fixed to the second fixing part 138*b*.

The first and second fixing parts 138*a* and 138*b* are disposed in the middle of the first and second lamps 135*a* and 135*a*' to face each other and fix the first and second lamps 135*a* and 135*a*' in position.

Other elements of the backlight assembly according to the fourth exemplary embodiment are identical to those of the backlight assembly according to the first exemplary embodiment described above, and thus a detailed description thereof is omitted.

Like the backlight assemblies according to the second and third exemplary embodiments, a backlight assembly according to a modified embodiment may comprise two or more distance-fixing parts identical to the distance-fixing part 138 according to the fourth exemplary embodiment. Since the modified embodiment can be derived from the above description by those of ordinary skill in the art, a detailed description thereof is omitted.

The display device according to the fourth exemplary embodiment, which comprises the backlight assembly 190 (see FIG. 1) according to the fourth exemplary embodiment, can also be derived from the above description by those of ordinary skill in the art, and thus a detailed description thereof is omitted.

Hereinafter, a backlight assembly and a display device according to a fifth exemplary embodiment of the present disclosure will be described with reference to FIGS. 20 and 21. In the fifth exemplary embodiment, elements having the same functions as those of the first exemplary embodiment are indicated by like reference numerals, and thus their description will be omitted.

First, the backlight assembly according to the fifth exemplary embodiment of the present disclosure will be described with reference to FIGS. 20 and 21.

Figure 20:
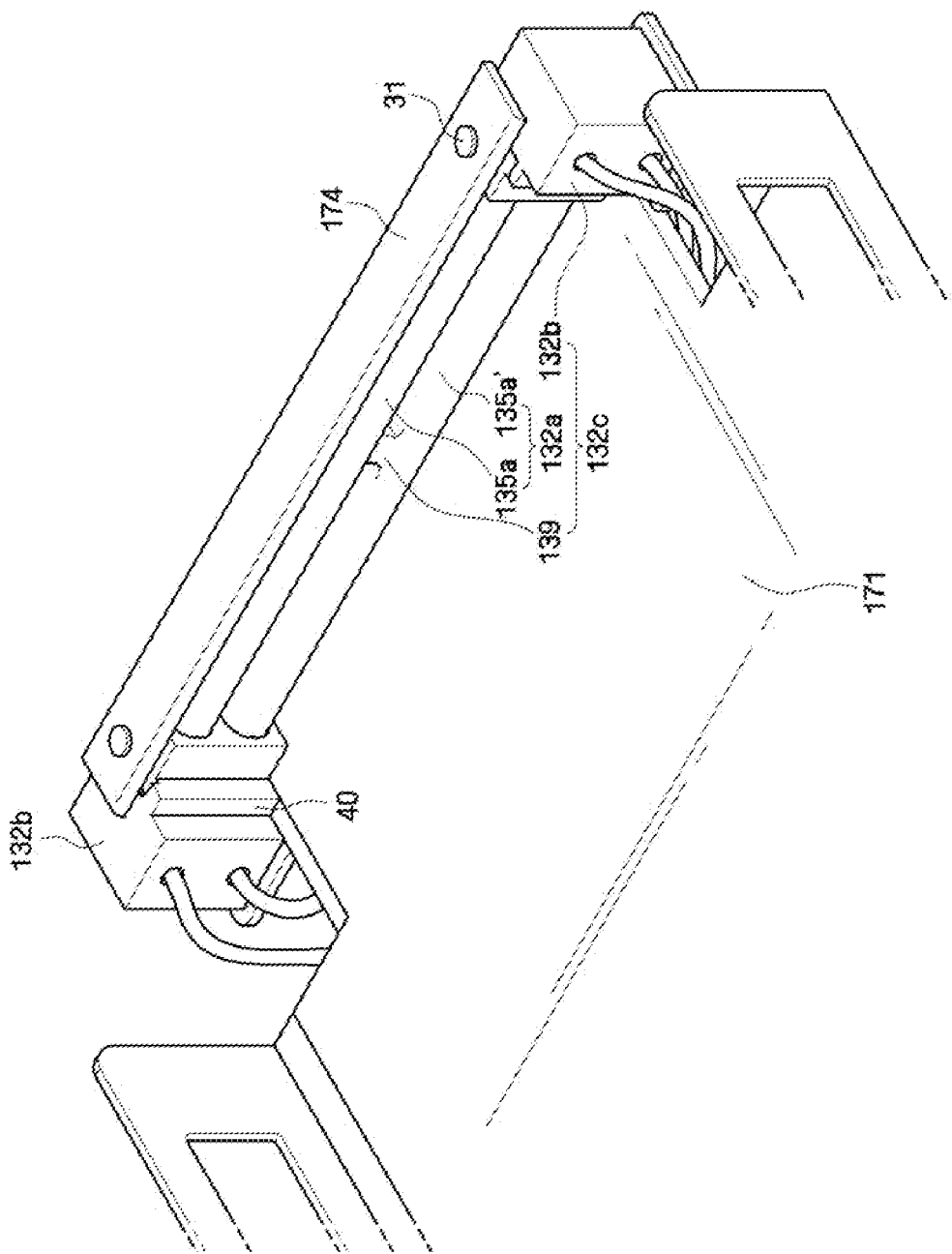
FIG. 20 is a schematic view of a backlight assembly, in which first and second lamps, holders, and an inter-lamp fixing part are coupled to each other, according to a fifth exemplary embodiment.

FIG. 20 is a schematic view of a backlight assembly 190 (see FIG. 1), in which first and second lamps 135a and 135a', holders 132b, and an inter-lamp fixing part 139 are coupled to each other, according to a fifth exemplary embodiment of the present disclosure. FIG. 21 is a side view of the backlight assembly 190 shown in FIG. 20.

Referring to FIGS. 20 and 21, in the backlight assembly 190 (see FIG. 1) according to the fifth exemplary embodiment, the first and second lamps 135a and 135a' are fixed between the two holders 132b, and the electrically insulative inter-lamp fixing part 139 is formed in the middle of the first and second lamps 135a and 135a' to fix the first and second lamps 135a and 135a' in position relative to one another as described above.

Specifically, both ends of the first lamp 135a are inserted and fixed to a first insertion groove 21 (see FIG. 6) which is formed in each of the two holders 132b, and both ends of the second lamp 135a' are inserted and fixed to a second insertion groove 22 (see FIG. 6) which is formed in each of the two holders 132b.

The inter-lamp fixing part 139 connects the first and second lamps 135a and 135a' and is integrally formed with the first and second lamps 135a and 135a'. Specifically, the inter-lamp fixing part 139 may be formed as a glass tube such that a gas within the first lamp 135a can flow through the inter-lamp fixing part 139 to the second lamp 135a. Thus discharge or other electrical interaction between the lamps is encouraged to occur in this middle joining part 139 rather than elsewhere.

The inter-lamp fixing part 139 is formed in the middle of the first and second lamps 135a and 135a' and fix the first and second lamps 135a and 135a' in position.

Other elements of the backlight assembly according to the fifth exemplary embodiment are identical to those of the backlight assembly according to the first exemplary embodiment described above, and thus a detailed description thereof is omitted.

Like the backlight assemblies according to the second and third exemplary embodiments, a backlight assembly according to a modified embodiment may comprise two or more inter-lamp fixing parts identical to the inter-lamp fixing part 139 according to the fifth exemplary embodiment. Since the modified embodiment can be derived from the above description by those of ordinary skill in the art, a detailed description thereof is omitted.

The display device according to the fifth exemplary embodiment, which comprises the backlight assembly 190 (see FIG. 1) according to the fifth exemplary embodiment, can also be derived from the above description by those of ordinary skill in the art, and thus a detailed description thereof is omitted.

While the present disclosure has been particularly shown and described with reference to exemplary embodiments thereof, it will be understood by those of ordinary skill in the art that various changes in form and detail may be made therein without departing from the spirit and scope of the present teachings and disclosure. The exemplary embodiments should be considered in a descriptive sense only and not for purposes of limitation.

What is claimed is:

1. A backlight assembly structured to provide backlighting by way of light rays passing vertically through a lateral plane having first and second axes respectively extending laterally in respective and orthogonal first and second directions, the plane being substantially parallel to a corresponding flat panel display device, the backlight assembly comprising:
    an elongated first lamp extending in the first direction and having corresponding first and second ends;
    an elongated second lamp having corresponding third and fourth ends that are spaced apart from counterpart ones of the first and second ends of the first lamp along a third direction that is orthogonal to the first and second directions and by a predetermined first gap distance (d1), where the second lamp extends in the first direction and substantially parallel to the first lamp; and
    a distance-fixing part fixing a spacing in the third direction and between the first and second lamps in a non-end position along the lengths of the elongated lamps so as to define a second gap distance (d2) along the third direction and between adjacent portions of the first and second lamps at that non-end position, where the second gap distance (d2) is smaller than the first gap distance (d1).

2. The backlight assembly of claim 1, wherein the second gap distance is between about 75% to about 99% of the first gap distance.

3. The backlight assembly of claim 2, wherein two or more distance-fixing parts are installed, and respective second gaps in the distance-fixing parts are equal to each other.

4. The backlight assembly of claim 2, wherein two or more distance-fixing parts are installed, and respective second gap distances in the distance-fixing parts are different from each other.

5. The backlight assembly of claim 1, wherein the distance-fixing part comprises a first through-hole fixing the first lamp to the distance-fixing part and a second through-hole fixing the second lamp to the distance-fixing part, wherein a gap distance between the first through-hole and the second through-hole is equal to the second gap distance (d2).

6. The backlight assembly of claim 5, further comprising an ends holder simultaneously fixing ends of the first and second lamps in position, wherein the ends holder comprises a first insertion groove into which an end of the first lamp is inserted and a second insertion groove into which an end of the second lamp is inserted, and where a gap distance defined between the first insertion groove and the second insertion groove is equal to the first gap distance (d1).

7. The backlight assembly of claim 6, wherein the ends holder further comprises three contact protrusions in each of the first and second insertion grooves, wherein the three contact protrusions securely fix each of the first and second lamps to a respective surface of a respective one of the first and second insertion grooves.

8. The backlight assembly of claim 6, wherein the gap between the first through-hole and the second through-hole is equal to the first gap distance (d1).

9. The backlight assembly of claim 1, wherein two or more distance-fixing parts are arranged at regular intervals.

10. The backlight assembly of claim 1, wherein two or more distance-fixing parts are arranged at predetermined graduation intervals.

11. The backlight assembly of claim 1, further comprising a housing accommodating the first lamp, the second lamp, and the distance-fixing part, wherein the distance-fixing part comprises a first fixing part and a second fixing part which are fixed to the housing and respectively fix the first lamp and the second lamp in position, wherein the first fixing part and the second fixing part are separated from each other.

12. The backlight assembly of claim 11, wherein the first fixing part and the second fixing part face each other.

13. The backlight assembly of claim 1, wherein the distance-fixing part includes an inter-lamp fixing part that connects the first and second lamps and is integrally formed with the first and second lamps.

14. A display device comprising:
a display panel configured for displaying an image; and
a backlight assembly structured to provide light to the display panel,
wherein the backlight assembly comprises:
- a light guide plate having a laterally extending major surface disposed for supplying backlighting light to the display panel;
- a first lamp extending in a lateral first direction and disposed for providing edge lighting to the light guide plate;
- a second lamp, vertically separated from the first lamp by a first gap distance and also extending substantially in the lateral first direction so as to be substantially parallel to the first lamp; and
- a distance-fixing part fixing the first and second lamps in position such that a vertically extending, second gap distance between overlapping portions of the first and second lamps at a predetermined location on the overlapping portions of the first and second lamps is smaller than the first gap distance.

15. The display device of claim 14, wherein the backlight assembly further comprises a housing comprising a first surface which is separated from the first lamp by a third gap and extends parallel to the first lamp, and the distance-fixing part fixes the first lamp in position such that a fourth gap between overlapping portions of the first lamp and the first surface of the housing at a predetermined location on the overlapping portions of the first lamp and the first surface of the housing is larger than the third gap.

16. The display device of claim 14, wherein the backlight assembly further comprises the housing comprising a second surface which is separated from the second lamp by a fifth gap and extends parallel to the second lamp, and the distance-fixing part fixes the second lamp in position such that a sixth gap between overlapping portions of the second lamp and the second surface of the housing at a predetermined location on the overlapping portions of the second lamp and the second surface of the housing is larger than the fifth gap.

17. A method of reducing likelihood of coupling of electrical noise and/or of corona discharge from plural high voltage and elongated lamps to sensitive other parts of an electronic device housing the lamps, the method comprising:
assuring that a gap distance ($d2$) between adjacent lamps and at an intermediate position along the lengths of the adjacent lamps is sufficiently small and sufficiently smaller than an at-ends gap distance ($d1$) between the adjacent lamps so that if it is generated, electrical interaction noise between the lamps and/or corona discharge between the lamps is substantially more likely to occur at the intermediate position, where the sufficiently small gap distance ($d2$) is present, rather than near ends of the lamps where the lamps electrically connect to a power supply of the electronic device.

* * * * *